US012119174B1

(12) United States Patent
Kane

(10) Patent No.: US 12,119,174 B1
(45) Date of Patent: Oct. 15, 2024

(54) MAGNETIC PLATE(S)

(71) Applicant: The Ridge Wallet LLC, Santa Monica, CA (US)

(72) Inventor: Daniel Kane, Agoura Hills, CA (US)

(73) Assignee: The Ridge Wallet LLC, Santa Monica, CA (US)

( * ) Notice: Subject to any disclaimer, the term of this patent is extended or adjusted under 35 U.S.C. 154(b) by 0 days.

(21) Appl. No.: 18/424,543

(22) Filed: Jan. 26, 2024

(51) Int. Cl.
*H01F 7/02* (2006.01)
*A45C 11/18* (2006.01)
*A45C 13/10* (2006.01)
*H01F 1/00* (2006.01)
*H04M 1/02* (2006.01)
*H04M 1/72409* (2021.01)
*A45C 11/00* (2006.01)

(52) U.S. Cl.
CPC .......... *H01F 7/0252* (2013.01); *A45C 11/182* (2013.01); *A45C 13/1069* (2013.01); *H01F 1/0009* (2013.01); *H04M 1/0254* (2013.01); *H04M 1/72409* (2021.01); *A45C 2011/002* (2013.01)

(58) Field of Classification Search
CPC ... H01F 1/0009; H01F 7/0252; A45C 11/182; A45C 2011/002; A45C 13/1069; H04M 1/0254; H04M 1/72409
See application file for complete search history.

(56) References Cited

U.S. PATENT DOCUMENTS

| 11,348 A | 7/1854 | Andrews |
| D29,232 S | 8/1898 | Byrnes |
| D30,701 S | 5/1899 | Haslup |
| D32,985 S | 7/1900 | Musselman |
| 881,757 A | 3/1908 | Winsor |

(Continued)

FOREIGN PATENT DOCUMENTS

| CN | 304692057 S | 6/2018 |
| CN | 306789903 | 8/2021 |

(Continued)

OTHER PUBLICATIONS

3D Printed Airtag Cash Clip—Aviator Wallet website: https://aviatorwallet.com/products/airtag-3d-printed-cashclip—5 pages (date of retrieval Nov. 11, 2022).

(Continued)

*Primary Examiner* — Ramon M Barrera
(74) *Attorney, Agent, or Firm* — K&L Gates LLP; Brian J. Novak; Giorgios N. Kefallinos

(57) ABSTRACT

A magnetic plate may be provided by a device, comprising: a first magnet, a second magnet, and a third magnet; a plate defining: a first indentation in which the first magnet is disposed; a second indentation in which the second magnet is disposed; and a third indentation in which the third magnet is disposed; and a contact surface; and, a target area; wherein: the first indentation, the second indentation, and the third indentation are located on the plate relative to a target area of the plate so that a net magnetic field generated by the first magnet, second magnet, and third magnet has a field strength that is below a predefined threshold within the target area. A keying feature may be provided so as to prevent misalignment between the plate and a device to which it can be magnetically connected.

19 Claims, 19 Drawing Sheets

(56) References Cited

U.S. PATENT DOCUMENTS

| | | |
|---|---|---|
| 1,400,652 A | 12/1921 | Anderson |
| 1,525,745 A | 2/1925 | Keefer |
| 2,322,461 A | 6/1943 | Mariano |
| 2,409,019 A | 10/1946 | Cree |
| D168,398 S | 12/1952 | Gazan |
| D173,148 S | 10/1954 | Emmite |
| 2,691,837 A | 10/1954 | Gove |
| D189,333 S | 11/1960 | Hayden |
| 3,139,977 A | 7/1964 | Richard |
| D206,783 S | 1/1967 | McCormick |
| D209,035 S | 10/1967 | Robert |
| D221,412 S | 8/1971 | Laughlin |
| D249,766 S | 10/1978 | Munn |
| 4,141,400 A | 2/1979 | Mangan |
| 4,477,928 A | 10/1984 | Graff |
| 4,675,953 A | 6/1987 | Higgs |
| D301,017 S | 5/1989 | Norman |
| 4,918,299 A | 4/1990 | Ohmori |
| D314,865 S | 2/1991 | Tuisku |
| 5,038,985 A | 8/1991 | Chapin |
| 5,077,869 A | 1/1992 | Haase |
| D324,305 S | 3/1992 | Prey |
| 5,103,884 A | 4/1992 | Roman |
| 5,184,282 A | 2/1993 | Kaneda et al. |
| 5,249,437 A | 10/1993 | Cole |
| 5,328,026 A | 7/1994 | Newman |
| 5,540,367 A | 7/1996 | Kauker |
| D372,358 S | 8/1996 | Mathison |
| 5,617,751 A | 4/1997 | Song |
| D383,701 S | 9/1997 | Fletcher |
| D384,499 S | 10/1997 | Gaestel |
| D384,971 S | 10/1997 | Kawan |
| D385,417 S | 10/1997 | White et al. |
| D390,493 S | 2/1998 | Fletcher |
| D393,813 S | 4/1998 | Herdt |
| D400,466 S | 11/1998 | Gleason |
| 5,944,080 A | 8/1999 | Podwika |
| 5,952,637 A | 9/1999 | Strunk |
| 6,044,967 A | 4/2000 | Painsith |
| 6,094,747 A | 8/2000 | Malick |
| D431,341 S | 9/2000 | DiPaolo et al. |
| D435,340 S | 12/2000 | Kojoori |
| 6,318,918 B1 | 11/2001 | Sasaki |
| D461,427 S | 8/2002 | Braner |
| D463,055 S | 9/2002 | Layne |
| D467,247 S | 12/2002 | Pentz |
| D488,932 S | 4/2004 | Forster |
| D492,351 S | 6/2004 | Sato |
| 6,870,483 B1 | 3/2005 | Davis |
| D505,337 S | 5/2005 | Cooper |
| 6,962,253 B1 | 11/2005 | McZeek |
| D512,835 S | 12/2005 | Hunter, Jr. et al. |
| 6,971,147 B2 | 12/2005 | Halstead |
| D534,584 S | 1/2007 | Goldberg |
| 7,172,127 B1 | 2/2007 | Poland |
| D537,752 S | 3/2007 | Goldberg |
| D538,704 S | 3/2007 | Kaminski |
| D544,040 S | 6/2007 | Burns |
| D561,469 S | 2/2008 | Jensen et al. |
| 7,334,616 B2 | 2/2008 | Kaminski |
| D576,912 S | 9/2008 | Yuengling |
| D585,643 S | 2/2009 | Preston-Hall |
| D590,151 S | 4/2009 | Karobkinda et al. |
| D591,044 S | 4/2009 | Lakhiani |
| D591,356 S | 4/2009 | Lanman et al. |
| 7,527,081 B2 | 5/2009 | Coates |
| D596,508 S | 7/2009 | Warren |
| D611,249 S | 3/2010 | Uzelac |
| D611,994 S | 3/2010 | Lanman et al. |
| D613,293 S | 4/2010 | Sheba |
| D620,785 S | 8/2010 | Germaine |
| 7,810,683 B2 | 10/2010 | Chan |
| D627,786 S | 11/2010 | Hsia |
| D628,795 S | 12/2010 | Sanders |
| D632,297 S | 2/2011 | Berntsen |
| D632,695 S | 2/2011 | Berntsen |
| D647,810 S | 11/2011 | Bohrer |
| D653,967 S | 2/2012 | Blake |
| 8,255,018 B2 | 8/2012 | Plaster |
| D676,618 S | 2/2013 | Kalbach |
| 8,381,360 B2 | 2/2013 | Preston-Hall |
| D677,193 S | 3/2013 | MacDonald |
| D679,618 S | 4/2013 | Dumas |
| D690,931 S | 10/2013 | Minn et al. |
| 8,567,460 B1 | 10/2013 | Lentsch |
| D695,013 S | 12/2013 | Minn et al. |
| D701,043 S | 3/2014 | Minn et al. |
| D703,267 S | 4/2014 | Harvey Pennaz |
| 8,701,588 B2 | 4/2014 | Clarke |
| 8,726,952 B2 | 5/2014 | Jambunathan et al. |
| D707,584 S | 6/2014 | Webb |
| D710,741 S | 8/2014 | Hirschorn |
| D716,043 S | 10/2014 | Wilk |
| D717,197 S | 11/2014 | Kinskey |
| D718,932 S | 12/2014 | Gross et al. |
| 8,914,949 B2 | 12/2014 | Thomson et al. |
| D721,610 S | 1/2015 | Tavone |
| D721,945 S | 2/2015 | Underkofler |
| D730,225 S | 5/2015 | Behar |
| D739,778 S | 9/2015 | Vu et al. |
| 9,125,464 B2 | 9/2015 | Minn et al. |
| D740,155 S | 10/2015 | Vang |
| D745,274 S | 12/2015 | Minn et al. |
| D751,889 S | 3/2016 | Thitges |
| 9,314,074 B2 | 4/2016 | Johnson et al. |
| 9,404,291 B1 | 8/2016 | White |
| D768,114 S | 10/2016 | Hou |
| D768,382 S | 10/2016 | Wu |
| D768,383 S | 10/2016 | Wu |
| D768,635 S | 10/2016 | Due |
| D769,143 S | 10/2016 | Warren |
| D770,775 S | 11/2016 | Robertson, III |
| D795,252 S | 8/2017 | Chung et al. |
| D807,636 S | 1/2018 | Chamberlain et al. |
| D811,730 S | 3/2018 | Pullum |
| 9,907,371 B2 | 3/2018 | Ross |
| D814,184 S | 4/2018 | Parsons |
| D817,316 S | 5/2018 | Srour |
| D835,410 S | 12/2018 | Chan et al. |
| D844,322 S | 4/2019 | Bo |
| D851,928 S | 6/2019 | Moore |
| D860,645 S | 9/2019 | Wu |
| D866,962 S | 11/2019 | Parsons |
| D866,964 S | 11/2019 | Tran et al. |
| D867,757 S | 11/2019 | Justiss |
| D868,463 S | 12/2019 | Tran et al. |
| 10,529,258 B1 | 1/2020 | Brown et al. |
| D877,594 S | 3/2020 | Liang et al. |
| D878,039 S | 3/2020 | Cantoli-Alves et al. |
| D884,338 S | 5/2020 | Liu |
| D887,132 S | 6/2020 | Puglisi |
| D895,963 S | 9/2020 | Anderson |
| D895,964 S | 9/2020 | Grafilo |
| D896,506 S | 9/2020 | Anderson |
| 10,791,808 B2 | 10/2020 | Kane |
| D902,194 S | 11/2020 | Gluck |
| D903,312 S | 12/2020 | Bauer et al. |
| D904,386 S | 12/2020 | Luo |
| D908,351 S | 1/2021 | Hoffman |
| D934,560 S | 11/2021 | Tran et al. |
| D936,505 S | 11/2021 | Umair |
| D938,165 S | 12/2021 | Schillings |
| D940,689 S | 1/2022 | Feng |
| D951,632 S | 5/2022 | Tran et al. |
| D953,025 S | 5/2022 | Laemle |
| D954,435 S | 6/2022 | Yang |
| D956,415 S | 7/2022 | Tran et al. |
| D960,017 S | 8/2022 | Wu |
| D961,252 S | 8/2022 | Ying |
| 11,399,608 B2 | 8/2022 | Huang et al. |
| 11,420,316 B2 | 8/2022 | Liang et al. |
| D964,735 S | 9/2022 | Zeng |
| D970,887 S | 11/2022 | Kalbach |
| D972,841 S | 12/2022 | Tran et al. |

(56) References Cited

U.S. PATENT DOCUMENTS

| | | |
|---|---|---|
| D974,346 S | 1/2023 | Xie |
| D974,945 S | 1/2023 | Deng |
| D975,998 S | 1/2023 | Yang |
| D976,576 S | 1/2023 | Sirichai |
| D976,582 S | 1/2023 | Del Moral et al. |
| D976,583 S | 1/2023 | Wu |
| D977,831 S | 2/2023 | Zeng |
| D978,530 S | 2/2023 | Lu |
| D979,936 S | 3/2023 | Zeng |
| 11,596,212 B2 | 3/2023 | Kane |
| D982,900 S | 4/2023 | Goldstein |
| D983,520 S | 4/2023 | Zeng |
| D990,563 S | 6/2023 | Kane |
| D991,346 S | 7/2023 | Kane |
| D1,000,830 S | 10/2023 | Wang |
| D1,002,192 S | 10/2023 | Wang |
| 11,793,283 B1 | 10/2023 | Zhang |
| D1,003,599 S | 11/2023 | Sande et al. |
| D1,006,441 S | 12/2023 | Kane |
| D1,007,146 S | 12/2023 | Lin |
| D1,008,654 S | 12/2023 | Kane |
| 11,839,277 B1 | 12/2023 | Peng |
| D1,011,031 S | 1/2024 | Kane |
| D1,011,740 S | 1/2024 | Shan |
| D1,016,479 S | 3/2024 | Cui |
| D1,018,362 S | 3/2024 | Xia |
| 2002/0056652 A1 | 5/2002 | Kawamura et al. |
| 2002/0179463 A1 | 12/2002 | Newman |
| 2004/0103500 A1 | 6/2004 | Ward |
| 2005/0023157 A1 | 2/2005 | Logan |
| 2006/0010661 A1 | 1/2006 | Murphy |
| 2006/0076094 A1 | 4/2006 | Kaminski |
| 2006/0237107 A1 | 10/2006 | Speck |
| 2008/0083829 A1 | 4/2008 | Lowe |
| 2008/0178976 A1 | 7/2008 | Lakhiani |
| 2009/0094795 A1 | 4/2009 | Lazarus |
| 2009/0134223 A1 | 5/2009 | Matthews et al. |
| 2009/0211062 A1 | 8/2009 | Preston-Hall |
| 2010/0139049 A1 | 6/2010 | Glickfield |
| 2011/0308972 A1 | 12/2011 | Streem |
| 2012/0180917 A1 | 7/2012 | Armstrong |
| 2013/0206055 A1 | 8/2013 | Moran Wexler |
| 2013/0276943 A1 | 10/2013 | Minn |
| 2014/0060712 A1 | 3/2014 | Beckley |
| 2014/0233181 A1 | 8/2014 | Harms |
| 2015/0059936 A1 | 3/2015 | Singer |
| 2015/0059937 A1 | 3/2015 | Singer |
| 2015/0083289 A1 | 3/2015 | Johnson |
| 2015/0335113 A1 | 11/2015 | Minn et al. |
| 2015/0342314 A1 | 12/2015 | Christy |
| 2016/0022000 A1 | 1/2016 | Tucker-Skow et al. |
| 2016/0324283 A1 | 11/2016 | Kane |
| 2017/0065047 A1 | 3/2017 | Van Der Laan |
| 2018/0012435 A1 | 1/2018 | Finn |
| 2018/0027935 A1 | 2/2018 | Laatz |
| 2019/0008253 A1 | 1/2019 | Deng |
| 2019/0198212 A1* | 6/2019 | Levy .................. F16M 11/2021 |
| 2019/0208046 A1 | 7/2019 | Gluck |
| 2019/0375087 A1 | 12/2019 | Liang et al. |
| 2019/0380458 A1 | 12/2019 | Muldowney, Jr. |
| 2020/0337426 A1 | 10/2020 | Huang et al. |
| 2021/0337945 A1 | 11/2021 | Popoff |
| 2022/0240635 A1 | 8/2022 | Timpson et al. |
| 2023/0109615 A1 | 4/2023 | Kane |
| 2023/0189949 A1 | 6/2023 | Kane |
| 2023/0210232 A1 | 7/2023 | Kane |
| 2023/0225470 A1 | 7/2023 | Kane |
| 2023/0232947 A1 | 7/2023 | Kane |
| 2023/0284758 A1 | 9/2023 | Espartero |
| 2023/0413962 A1 | 12/2023 | Kane |

FOREIGN PATENT DOCUMENTS

| | | |
|---|---|---|
| CN | 306806204 | 9/2021 |
| CN | 307103944 | 2/2022 |
| CN | 307863259 | 2/2023 |
| DM | 219325 | 3/2022 |
| EM | 003500669-0001 | 12/2016 |
| EM | 005941820-0001 | 3/2019 |
| EM | 008644611-0001 | 8/2021 |
| EM | 008934491-0001 | 4/2022 |
| EM | 008934491-0002 | 4/2022 |
| EM | 008944177-0003 | 4/2022 |
| EM | 015001951-0001 | 11/2022 |
| EM | 015001951-0002 | 11/2022 |
| EM | 015001953-0001 | 11/2022 |
| EM | 015001953-0002 | 11/2022 |
| EP | 0251900 B1 | 7/1990 |
| EP | 4070683 A1 | 10/2022 |
| EP | 4079183 A1 | 10/2022 |
| GB | 2069659 | 5/1997 |
| GB | 6025575 | 1/2018 |
| GB | 6157164 | 8/2021 |
| GB | 6198997 | 3/2022 |
| HK | 2219606-0002 | 7/2022 |
| IN | 280018-0001 | 2/2016 |
| JP | D1736723 | 2/2023 |
| JP | D1736774 | 2/2023 |
| KR | 3020090000769 | 7/2009 |
| KR | 301131264 | 10/2021 |
| KR | 3011929580002 | 11/2022 |
| KR | 3011929580003 | 11/2022 |
| KR | 3011929580004 | 11/2022 |
| KR | 3011929580005 | 11/2022 |
| WO | 2016/179586 A1 | 11/2016 |

OTHER PUBLICATIONS

Design U.S. Appl. No. 29/895,097, filed Jun. 16, 2023.
Design U.S. Appl. No. 29/896,574, filed Jul. 5, 2023.
Airtag Carbon Case—The Ridge website: https://ridge.com/products/carbon-case-for-airtag—6 pages (date of retrieval Nov. 14, 2022).
Airtag Cash Strap—The Ridge website: https://ridge.com/products/airtag-cash-strap—8 pages (date of retrieval Nov. 13, 2022).
Airtag Dog Collar Case—Case-Mate website: https://case-mate.com/products/airtag-dog-collar-case-black—7 pages (date of retrieval Nov. 14, 2022).
Airtag Dog Collar Holder—Cyrill website: https://www.amazon.com/CYRILL-Airtag-Collar-Leather-Accessory/dp/B08C9MY9JV—9 pages (date of retrieval Nov. 2022).
Airtag Holder—Fantom X website: https://store.fantomwallet.com/fantom-x-airtag-holder/—7 pages (date of retrieval Nov. 14, 2022).
Airtag Money Clip—The Ridge website: https://ridge.com/products/airtag-money-clip—6 pages (date of retrieval Nov. 11, 2022).
Airtag Wallet Minimalist Holder—Borgasets Store website: https://www.amazon.com/Airtag-Wallet-Minimalist-Holder-Wallets/dp/B09TZTD2HY—6 pages (date of retrieval Nov. 14, 2022).
Donword Minimalist Wallet for Men RFID Blocking Aluminum Wallet Carbon Fiber Card Case Metal Wallet Minimalist Front Pocket Card Holder Cash Strap Mens Wallet (Black), photo reviewed on Jun. 13, 2021, Amazon.com, site visited Mar. 21, 2023: https://www.amazon.com/Minimalist-Wallet-Blocking-Aluminum-Carbon/dp/B08YXDVL5D/ref=cm_cr_arp_d_product_top?ie=UTF8&th=1 (Year: 2021).
Hayvenhurst Slim Wallet For Men—Front Pocket RFID Blocking Minimalist Wallet For Men—Metal Wallet With Money Clip For Men (Carbon Fiber), photo reviewed on Jun. 8, 2021, Amazon.com, site visited Mar. 22, 2023: https://www.amazon.com/RFID-Blocking-Slim-Wallet-Moneyclip-Metal-Wallet/dp/B091JH8P34/ref=cm_cr_arp_d_product_top?ie=UTF8&th=1 (Year: 2021).
Metal Airtag Holder—Aviator Wallet website: https://aviatorwallet.com/collections/aviator-wallet-accessoires/products/metal-airtag-cash-clips—4 pages (date of retrieval Nov. 14, 2022).
Metal Wallets for men with Money Clip—Slim Minimalist Aluminum Wallet Credit Card Holder RFID Blocking (Cd Raised Grain, Black), photo review Jun. 20, 2019, Amazon.com, site visited Mar. 23, 2023: https://www.amazon.com/Metal-Minimalist-Wallet-Money-Clip/dp/B07JPHBLD1?th=1 (Year: 2019).

(56) References Cited

OTHER PUBLICATIONS

My Favorite Minimalist Aluminum Wallet, first available Sep. 14, 2019, youtube.com, site visited Mar. 22, 2023: https://www.youtube.com/watch?v=ul12aKtwXfk (Year: 2019).
Notification of Reasons for Rejection, dated Jan. 17, 2023, for related Japanese Design Application No. 2022-007271.
Notification of Reasons for Rejection, dated Jan. 17, 2023, for related Japanese Design Application No. 2022-008280.
Notification of Reasons for Rejection, dated Jan. 17, 2023, for related Japanese Design Application No. 2022-008281.
Notification of Reasons for Rejection, dated Jan. 17, 2023, for related Japanese Design Application No. 2022-008282.
Notification of Reasons for Rejection, dated Jan. 17, 2023, for related Japanese Design Application No. 2022-008283.
Pet Collar Airtag Holder—Wasserstein website: https://wasserstein-home.com/products/wasserstein-pet-collar-airtag-holder-compatible-with-apple-airtag-protective-silicone-case-for-gps-tracker-2-pack-black-and-white—4 pages (date of retrieval Nov. 14, 2022).
PLUSKA Carbon Fiber Wallet, RFID Blocking Minimalist Aluminum Metal Money Clip Wallet, Easy Access Minimalist Wallet for Men, Front Pocket Card Holder, Slim Wallet, Preferred Gift, reviewed on Oct. 25, 2021, Amazon.com, site visited Mar. 21, 2023: https://www.amazon.com/PLUSKA-Wallet%EF%BC%8CRFID-Minimalist-Men%EF%BC%8CFront-Preferred/dp/B09FXFSZK8/ref=cm_cr_arp_d_product_top?ie=UTF8 (Year: 2021).
Pop-Up Card Holder—Slashare website: https://slashare.com/products/mens-pop-up-card-holder-rfid-wallet-airtag-holder-pu-leather-wallet—12 pages (date of retrieval Nov. 2022).
RFID Blocking Front Pocket—Aluminum Slim Wallet/Travel Money Clip Credit Card Holder, first available Jan. 9, 2018, Amazon.com, site visited Mar. 22, 2023: https://www.amazon.com/RFID-Blocking-Front-Pocket-Aluminum/dp/B078X7HMC2/ref=cm_cr_arp_d_product_top?ie=UTF8 (Year: 2018).
Ridge Wallet Review, first available May 14, 2015, the-gadgeteer.com, site visited Mar. 23, 2023: https://the-gadgeteer.com/2015/05/14/ridge-wallet-review/ (Year: 2015).
Screw Heads Explained—With Kyle, first available Apr. 26, 2016, YouTube.com, site visited Mar. 23, 2023: https://www.youtube.com/watch?v=RF0EIIYesVE (Year: 2016).
The Ridge Minimalist Slim Wallet For Men—RFID Blocking Front Pocket Credit Card Holder—Aluminum Metal Small Mens Wallets with Cash Strap (Gunmetal), photo reviewed on Oct. 25, 2018, Amazon.com, site visited Mar. 21, 2023: https://www.amazon.com/Ridge-Authentic-Minimalist-Blocking-Wallet/dp/B01M5J3NB1/ref=cm_cr_arp_d_product_top?ie=UTF8&th=1 (Year: 2018).
The Ridge Wallet—Getting Started, first available Sep. 15, 2016, YouTube.com, site visited Mar. 22, 2023: https://www.youtube.com/watch?v=EBChreo_jdc (Year: 2016).
The Ridge Wallet—Removing/Installing the Money Clip, first available Sep. 22, 2016, The Ridge on YouTube.com, site visited Mar. 30, 2023: https://www.youtube.com/watch?v=iTLzs-jNFJ8 (Year: 2016).
The Ridge Wallet 2.0, last updated Jan. 27, 2014, kickstarter.com, site visited Mar. 23, 2023: https://www.kickstarter.com/projects/124039987/the-ridge-wallet-20?ref=discovery&term=ridge%20wallet (Year: 2014).
Tribe Ultralight Wallet Unboxing and Review—Slim Wallet Junkie, accessed, URL: https://www.youtube.com/watch?v=las3zqULdBk, Jun. 27, 2015.
Design U.S. Appl. No. 29/875,909, filed May 12, 2023.
Design U.S. Appl. No. 29/875,910, filed May 12, 2023.
Design U.S. Appl. No. 29/883,115, filed Jan. 24, 2023.
Design U.S. Appl. No. 29/883,116, filed Jan. 24, 2023.
Design U.S. Appl. No. 29/888,639, filed Apr. 3, 2023.
Design U.S. Appl. No. 29/888,734, filed Apr. 4, 2023.
Facebook post by The Ridge dated Dec. 21, 2016.
Facebook post by The Ridge dated Dec. 7, 2016.
Facebook post by The Ridge dated Jan. 11, 2016.
Facebook post by The Ridge dated Nov. 23, 2015.
Facebook post by The Ridge dated Nov. 13, 2015.
Facebook post by The Ridge dated Oct. 26, 2015.
Facebook post by The Ridge dated Oct. 23, 2015.
Facebook post by The Ridge dated Aug. 19, 2015.
Facebook post by The Ridge dated Aug. 19, 2014.
Facebook post by The Ridge dated Aug. 15, 2014.
Facebook post by The Ridge dated Feb. 5, 2015.
Facebook post by The Ridge dated Dec. 5, 2014.
Facebook post by The Ridge dated Nov. 20, 2014.
Facebook post by The Ridge dated Nov. 19, 2014.
Facebook post by The Ridge dated Nov. 6, 2014.
Facebook post by The Ridge dated Oct. 28, 2014.
Facebook post by The Ridge dated Oct. 13, 2014.
Facebook post by The Ridge dated Oct. 9, 2014.
Facebook post by The Ridge dated Sep. 24, 2014.
Facebook post by The Ridge dated Aug. 26, 2014.
Third-Party Submission under 37 CFR 1.290, filed in Design U.S. Appl. No. 29/812,273, on Apr. 17, 2023.
The Ridge: Front Pocket Wallet (Kickstarter), Published May 23, 2013, URL: <https://www.kickstarter.com/projects/124039987/the-bridge-front-pocket-wallet>, archived by the Wayback Machine, URL: <https://web.archive.org/web/20130523102304/https://www.kickstarter.com/projects/124039987/the-bridge-front-pocket-wallet>.
Smart Money Clip (Storus), Published Sep. 26, 2016, URL: <https://www.storus.com>, archived by the Wayback Machine, URL: <https://web.archive.org/web/20160926120005/http://www.storus.com/>.
URL: <https://www.grid-wallet.com/>, Published Jan. 29, 2018, archived by the Wayback Machine, URL: <https://web.archive.org/web/20180129191446/https:/ www.grid-wallet.com/>.
URL: <https://www.grid-wallet.com/>, Published Aug. 26, 2018, archived by the Wayback Machine, URL: <https://web.archive.org/web/20180826165157 /https:// www .grid-wallet.com/>.
URL: <https://www.amazon.com/Minimalist-Wallet-Blocking-Alnminnm-Carbon/dp/B08YWHFIQ7/ref=sr_1_3_sspa?hvadid=345542215411&hvdev=c&hvlocphF9015370&hvnem=g&hvqmt=e&hvrand=12140724240925501331&hvtargid=kwd-746235658781&hydadcr=8375_9905011&keywords=donword%2Bslim%2Bwallet&qid=1681135503&sr=8-3-spons&spLa=ZW5jcnlwdGVkUXVhbGlmaWVyPUEzROQxRVoxRkRMOVFJJmVuY3J5cHRIZEIkPUEwNjA2MzYxMOw.
Third-Party Submission under 37 CFR 1.290, filed in Design U.S. Appl. No. 29/812,274, on Apr. 17, 2023.
Third-Party Submission under 37 CFR 1.290, filed in Design U.S. Appl. No. 29/813,522, on Apr. 17, 2023.
Third-Party Submission under 37 CFR 1.290, filed in Design U.S. Appl. No. 29/813,523, on Apr. 17, 2023.
Third-Party Submission under 37 CFR 1.290, filed in Design U.S. Appl. No. 29/813,524, on Apr. 17, 2023.
Third-Party Submission under 37 CFR 1.290, filed in Design U.S. Appl. No. 29/813,525, on Apr. 17, 2023.
Third-Party Submission under 37 CFR 1.290, filed in Design U.S. Appl. No. 29/813,527, on Apr. 17, 2023.
Third-Party Submission under 37 CFR 1.290, filed in Design U.S. Appl. No. 29/813,529, on Apr. 17, 2023.
Third-Party Submission under 37 CFR 1.290, filed in Design U.S. Appl. No. 29/813,530, on Apr. 17, 2023.
Third-Party Submission under 37 CFR 1.290, filed in Design U.S. Appl. No. 29/813,531, on Apr. 17, 2023.
Third-Party Submission under 37 CFR 1.290, filed in Design U.S. Appl. No. 29/813,532, on Apr. 17, 2023.
Third-Party Submission under 37 CFR 1.290, filed in Design U.S. Appl. No. 29/813,533, on Apr. 17, 2023.
Third-Party Submission under 37 CFR 1.290, filed in Design U.S. Appl. No. 29/813,537, on Apr. 17, 2023.
Third-Party Submission under 37 CFR 1.290, filed in Design U.S. Appl. No. 29/813,615, on Apr. 17, 2023.
Third-Party Submission under 37 CFR 1.290, filed in Design U.S. Appl. No. 29/813,617, on Apr. 17, 2023.
Third-Party Submission under 37 CFR 1.290, filed in Design U.S. Appl. No. 29/813,624, on Apr. 17, 2023.
Third-Party Submission under 37 CFR 1.290, filed in Design U.S. Appl. No. 29/813,625, on Apr. 17, 2023.

(56) References Cited

OTHER PUBLICATIONS

Third-Party Submission under 37 CFR 1.290, filed in Design U.S. Appl. No. 29/813,626, on Apr. 17, 2023.
Third-Party Submission under 37 CFR 1.290, filed in Design U.S. Appl. No. 29/813,628, on Apr. 17, 2023.
Third-Party Submission under 37 CFR 1.290, filed in Design U.S. Appl. No. 29/812,250, on Apr. 17, 2023.
Third-Party Submission under 37 CFR 1.290, filed in Design U.S. Appl. No. 29/812,251, on Apr. 17, 2023.
Third-Party Submission under 37 CFR 1.290, filed in Design U.S. Appl. No. 29/812,253, on Apr. 17, 2023.
Third-Party Submission under 37 CFR 1.290, filed in Design U.S. Appl. No. 29/812,255, on Apr. 17, 2023.
Third-Party Submission under 37 CFR 1.290, filed in Design U.S. Appl. No. 29/812,258, on Apr. 17, 2023.
Third-Party Submission under 37 CFR 1.290, filed in Design U.S. Appl. No. 29/812,260, on Apr. 17, 2023.
Third-Party Submission under 37 CFR 1.290, filed in Design U.S. Appl. No. 29/812,263, on Apr. 17, 2023.
Third-Party Submission under 37 CFR 1.290, filed in Design U.S. Appl. No. 29/812,268, on Apr. 17, 2023.
Third-Party Submission under 37 CFR 1.290, filed in Design U.S. Appl. No. 29/812,269, on Apr. 17, 2023.
Third-Party Submission under 37 CFR 1.290, filed in Design U.S. Appl. No. 29/822,078, on Apr. 17, 2023.
Design U.S. Appl. No. 29/896,575, filed Jul. 5, 2023.
Design U.S. Appl. No. 29/898,357, filed Jul. 26, 2023.
Design U.S. Appl. No. 29/898,360, filed Jul. 26, 2023.
Design U.S. Appl. No. 29/898,361, filed Jul. 26, 2023.
Design U.S. Appl. No. 29/898,352, filed Jul. 26, 2023.
Design U.S. Appl. No. 29/898,353, filed Jul. 26, 2023.
Design U.S. Appl. No. 29/898,354, filed Jul. 26, 2023.
"Ridge Wallet Review" (Kickstarter) Jul. 21, 2014, Retrieved from the Internet on Jul. 8, 2016, URL: <http://kickstarter.reviews/ridge-wallet-2/>.
"3m Bonding Tapes" (3M) Oct. 30, 2014. Retrieved from the Internet on Jul. 11, 2016, URL:<https://web.archive.org/web/20141030183241/http://www.ameyagroup.co.in/pdf/product%>.
Ridge Wallet KickStarter Campaign found at https://www.kickstarter.com/projects/124039987/the-bridge-front-pocket-wallet, Jan. 2013. The Ridge Wallet 2.0, https://www.kickstarter.com/projects/124039987/the-ridge-wallet-20, 36 pages (2013).
Design U.S. Appl. No. 29/813,614, filed Oct. 29, 2021.
Design U.S. Appl. No. 29/813,628, filed Oct. 29, 2021.
Design U.S. Appl. No. 29/822,078, filed Jan. 5, 2022.
Design U.S. Appl. No. 29/813,617, filed Oct. 29, 2021.
International Search Report and Written Opinion, mailed Aug. 19, 2016, for International Application No. PCT/2016/031472.
*Mosaic Brands, Inc.* v. *The Ridge Wallet LLC* Appeal Index, Case No. 2:20-cv-04556-AB-JC (1703 pp.); appeal regarding, inter alia, finding of anticipation for U.S. Pat. No. 10,791,808 (2020).
U.S. Appl. No. 17/490,201, filed Sep. 30, 2021.
Design U.S. Appl. No. 29/894,477, filed Jun. 9, 2023.
*Mosaic Brands, Inc.* v. *The Ridge Wallet LLC*. Opinion of Federal Circuit Reversing Summary Judgment of Invalidity. Decided: Dec. 20, 2022.
Design U.S. Appl. No. 29/813,523, filed Oct. 29, 2021.
Design U.S. Appl. No. 29/813,524, filed Oct. 29, 2021.
Design U.S. Appl. No. 29/813,615, filed Oct. 29, 2021.
Design U.S. Appl. No. 29/813,620, filed Oct. 29, 2021.
Design U.S. Appl. No. 29/813,625, filed Oct. 29, 2021.
Design U.S. Appl. No. 29/812,250, filed Oct. 20, 2021.
Design U.S. Appl. No. 29/812,251, filed Oct. 20, 2021.
Design U.S. Appl. No. 29/812,273, filed Oct. 20, 2021.
Design U.S. Appl. No. 29/812,274, filed Oct. 20, 2021.
Design U.S. Appl. No. 29/813,522, filed Oct. 29, 2021.
Design U.S. Appl. No. 29/813,525, filed Oct. 29, 2021.
Design U.S. Appl. No. 29/813,527, filed Oct. 29, 2021.
Design U.S. Appl. No. 29/813,529, filed Oct. 29, 2021.
Design U.S. Appl. No. 29/813,530, filed Oct. 29, 2021.
Design U.S. Appl. No. 29/813,531, filed Oct. 29, 2021.
Design U.S. Appl. No. 29/813,532, filed Oct. 29, 2021.
Design U.S. Appl. No. 29/812,253, filed Oct. 20, 2021.
Design U.S. Appl. No. 29/812,255, filed Oct. 20, 2021.
Design U.S. Appl. No. 29/812,258, filed Oct. 20, 2021.
Design U.S. Appl. No. 29/812,260, filed Oct. 20, 2021.
Design U.S. Appl. No. 29/812,263, filed Oct. 20, 2021.
Design U.S. Appl. No. 29/812,264, filed Oct. 20, 2021.
Design U.S. Appl. No. 29/812,268, filed Oct. 20, 2021.
Design U.S. Appl. No. 29/812,269, filed Oct. 20, 2021.
Design U.S. Appl. No. 29/857,719, filed Oct. 25, 2022.
Design U.S. Appl. No. 29/811,291, filed Oct. 13, 2021.
The Ridge Wallet 2.0, youtube, https://www.youtube.com/watch?v=lJwHouB9cGY&t=21s, Oct. 10, 2013 (cited by Examiner in U.S. Appl. No. 17/035,261).
Design U.S. Appl. No. 29/894,998, filed Jun. 15, 2023.
Design U.S. Appl. No. 29/896,573, filed Jul. 5, 2023.
Design U.S. Appl. No. 29/813,626, filed Oct. 29, 2021.
Design U.S. Appl. No. 29/882,878, filed Jan. 19, 2023.
Declaration of Dr. Kimberly K. Cameron regarding Claim Construction of the '808 Patent, dated May 16, 2023. In the Matter of: Certain Compact Wallets and Components Thereof. Investigation No. 337-TA-1355 (Enforcement Proceeding). United States International Trade Commission, Washington, D.C. (2023).
Rebuttal Declaration of Dr. Thomas R. Kurfess regarding Claim Construction of the '808 Patent, dated May 31, 2023. In the Matter of: Certain Compact Wallets and Components Thereof. Investigation No. 337-TA-1355 (Enforcement Proceeding). United States International Trade Commission, Washington, D.C. (2023).
"Smart Wallet," archived by WayBack Machine on Aug. 28, 2016, www.storus.com, site visited Nov. 22, 2023: https://web.archive.org/web/20160828215330/http:/www.storus.com/ (Year: 2016).
Delila Minimalist Slim Wallet for Men, available to the public no later than Jun. 20, 21 based on customer photo review, amazon.com [online], [site visited Dec. 13, 2023], Available at URL: https://www.amazon.com/dp/B0CFPYJXL5/?t1 (Year:2021).
Design U.S. Appl. No. 29/919,214, filed Dec. 1, 2023.
Design U.S. Appl. No. 29/919,216, filed Dec. 1, 2023.
Design U.S. Appl. No. 29/919,218, filed Dec. 1, 2023.
Shenzhen Pincan Technology Co., Ltd.—Petition for Inter Partes Review of U.S. Pat. No. 10,791,808, dated Jan. 2, 2024, IPR2024-00340, United States Patent Trial and Appeal Board, and exhibits thereto (2024).
Kimberly K. Cameron Ph.D.—Expert Report of Dr. Kimberly K. Cameron Ph. D. Regarding Invalidity of U.S. Pat. No. 10,791,808, Dated Aug. 25, 2023, Served and Stricken in ITC Case No. 337-TA-1355, Washington DC, USA.
Dr. Thomas R. Kurfess—Rebuttal Expert Report of Dr. Thomas R. Kurfess Regarding Alleged Invalidity and Materiality, Dated Sep. 19, 2023, Served and Mooted in ITC Case No. 337-TA-1355, Washington DC, USA.
The Ridge Wallet 2.0 discussion, with comments with various times, along one comment by Brian Boyle, dated Mar. 1, 2014 (Year: 2014) (Feb. 26, 2024 in U.S. Appl. No. 18/126,279).
JETech Silicone Case for AirTag, Amazon.com, site visited Nov. 15, 2023: https:///www.amazon.com/JETech-Silicone-Compatible-Protective-Portable/dp/B0989XH127 (Year: 2018).
TenCloud Clip Holder for Airtags, Amazon.com, site visited Nov. 15, 2023: https:///www.amazon.com/TenCloud-Anti-Slip-Silicone-Protector-Portable/dp/B07D6Q49LZ (Year: 2021).
HONB Money Clip Credit Card, Amazon.com, retrieved Aug. 10, 2023: https://www.amazon.com/HONB-Credit-Holder-Stainless-Polished/dp/B076YN9YGP (Year: 2013).
Affidavit of Scott Kaminski dated Aug. 14, 2023 in Case No. 20-cv-04556-AB-JC in the United States District Court for the Central District of California.
Deposition transcript from Jun. 16, 2023 deposition of Mia Kaminski in USITC Case No. 337-TA-1355.
Affidavit of George R. Johnson dated Feb. 10, 2023 in Case No. 20-cv-04556-AB-JC in the United States District Court for the Central District of California.

(56) References Cited

OTHER PUBLICATIONS

Affidavit of Chris M. Lowe dated Feb. 10, 2023 in Case No. 20-cv-04556-AB-JC in the United States District Court for the Central District of California.
Joint Stipulations for Dismissal of Entire Action Pursuant to Fed. R. Civ. P. 41(a)(1)(A)(ii) in Case No. 20-cv-04556-AB-JC in the United States District Court for the Central District of California.
Slide Presentation from Techshow2023, dated 2023 and entitled "Evidentiary Use of the Temporal Web," by Nicholas Taylor and Joe Dugan.
Simlet: RFID Minimalist Aluminum wallet, created by Anvi Original, launched on Mar. 7, 2017, Kickstarter.com, Site visited Apr. 30, 2024, https://www.kickstarter.com/projects/48449805/simlet-rfid-minimalist-aluminum-wallet-with-cash-s (Year:2017).
Slimwallets.com, Site visited Apr. 30, 2024, "T1 Slim Wallet By Wallum Review," published on May 4, 2018, https://slimwallets.com/t1-slim-wallet-review-wallum/ (Year: 2018).
Citadel Metal Wallets, Facebook.com/CitadelMetalWallets, Site visited Apr. 30, 2024, Oldest Photo dated Jan. 31, 2021, https://www.facebook.com/CitadelMetalWallets/photos (Year: 2021).
International Application Serial No. PCT/US2024/028872 filed May 10, 2024.
Sorax Carbon Fiber Wallet, Amazon.ca, date first available Jul. 9, 2019: https:///www.amazon.ca/Sorax-Minimalist-Slim-Wallet-Men/dp/B0CG9LMSK2J (Year: 2019).
The Ridge Wallet, Youtube.com, published by eyespy0099 on Aug. 12, 2015, https://www.youtube.comwatch?v=pDGlRSBWh6M (Year: 2015).
Men's Carbon Fiber Credit Card Wallet, Spysite.com, Via wayback machine on Aug. 12, 2020, https://web.archive.org/web/20200812125807/https://www.spysite.com/products/super-mini-wifi-camera-magnetic-wearable (Year: 2020).
Crosfen Carbon Fiber Wallet, Amazon.com, Date first available, Jun. 30, 2020, https://www.amazon.com/Minimalist-Carbon-Wallet-Blocking-Pocket/dp/B08C33KFMG (Year: 2020).
The Ridge 2.0 Wallet Unboxing, Youtube.com, published on Dec. 7, 2014 by Obsessively Geek features the Ridge 2.0, https://www.youtube.comwatch?v=VtOP7KofGPI&t=173s (Year: 2014).
Wallet Ninja Multitool Card, Amazon.com, Date first available Apr. 26, 2017, https://www.amazon.com/LIMITED-Wallet-Ninja-Multitool-Selling/dp/B0711687HD (Year: 2017).
ROSSM Slim RFID Blocking Wallet with Cash Strap, Amazon.ca, Date first available Oct. 22, 2019, https://www.amazon.ca/dp/B07XGZKS35 (Year: 2019).
Calti Tactical Wallet, Amazon.ca, Date first available, Jun. 4, 2018, https://www.amazon.ca/Tactical-Titanium-Minimalist-Slim-Wallet/dp/B07BJMB54J (Year: 2018).
Kenpal Slim Pocket Wallet, Amazon.ca, Date first available Nov. 9, 2018, https://www.amazon.ca/Metal-Minimalist-Wallet-Money-Clip/dp/B07R6Z1W9Q?th=1 (Year: 2018).
Savage Spartan Tactical Wallet, Amazon.ca, date first available May 30, 2019, https://amazon.ca/Savage-Spartan-Tactical-Minimalist-Blocking/dp/B0775LDHZ3?th=1 (Year: 2019).
GRID Aluminum band wallet, Youtube.com, published by walletopia on Apr. 13, 2019, https://www.youtube.com/watch?v=_Dfw-bwnT_U (Year: 2019).
Liquid Wallet, by Liquid, Kickstarter.com, Project launch date Feb. 16, 2014, https://www.kickstarter.com/projects/liquidco/the-liquid-wallet/posts (Year: 2014).
New Bring Key Holder Wallet, Amazon.ca, Date first available Nov. 23, 2017, https://www.amazon.ca/NEW-BRING-Multifunction-Holder-Credit-Organizer/dp/B077JS19VV?th=1 (Year: 2017).
ROCO Minimalist Aluminum Wallet, Amazon.com, Date first available Jan. 9, 2018, https://www.amazon.com/MINIMALIST-Aluminum-Wallet-BLOCKING-Money/dp/B06Y56L72N (Year: 2018).
5.11 Wallet, Amazon.com, Date first available Sep. 7, 2018, https://amazon.com/5-11-Jacket-Multitool-Multipurpose-Tumbleweed/dp/B07H5VXCTY (Year: 2018).
"Getting Started" published by Rahul Bhardwaj on Aug. 9, 2015 features the Modulus Wallet, Youtube.com, https://www.youtube.com/watch?v=UHJ0dOmGytQ (Year: 2015).
"T1 Slim Wallet By Wallum Review," published May 4, 2018, Slimwallets.com, https://slimwallets.com/t1-slim-wallet-review-wallum/ (Year: 2018).
Ridge Wallet, Youtube.com, published by Chrispy Things on Mar. 12, 2018, URL: https://www.youtube.com/watch?v=q2d4OfrlvpQ, retrieved on Dec. 18, 2023 (Cited by Examiner in corresponding Canadian Patent Application).
Xianguo Money Clip Credit Card Case, Amazon.co.jp, Date first available Sep. 7, 2019, https://www.amazon.co.jp/dp/B07Y31J77J (Year: 2019).
Olycism Coin holder coin case, Amazon.co.jp, Date first available Jul. 6, 2021, https://www.amazon.co.jp/dp/B08H1Z62VT?th=1 (Year: 2021).
Grid-wallet.com, features the Grid Wallet, first captured on Wayback Machine on Jan. 29, 2018, https://web.archive.org/web/20180129191446/https://www.grid-wallet.com/ (Year: 2016).
Citadel Metal Wallets, Oldest Photo dated Jan. 31, 2021, Facebook.com/CitadelMetalWallets, https://www.facebook.com/CitadelMetalWallets/photos (Year: 2021).
Kickstarter.com, Site visited May 7, 2024, The Ridge: Front Pocket Wallet, "Production Update and Surveys" published Apr. 26, 2013 and captured Apr. 30, 2013 on wayback machine, <https://web.archive.org/web/20130430234904/https://www.kickstarter.com/projects/124039987/the-bridge-front-pocket-wallet/posts/464913, 2013.
2985 LLC, D/B/A Mountain Voyage Compancy, LLC.—Petition for Inter Partes Review of U.S. Pat. No. 10,791,808, dated Mar. 15, 2024, IPR2024-00692, United States Patent Trial and Appeal Board, and exhibits thereto (2024).

* cited by examiner

MAGNETIC PLATE(S)

BACKGROUND

In today's lifestyle, persons carry various items with them at almost all times, including keys, a money carrying device, and a mobile phone. These items may be carried in a combination of pockets, purses, satchels, brief cases, or belt clips, but are often loose (e.g., a person may place a set of keys on a counter, take out a wallet to retrieve a credit card, or hold a mobile phone to message another person). Once out of a storage location, these items may easily become lost, particularly if placed in different locations from one another; leading to frustration and potentially substantial loss of value and/or information.

SUMMARY

The present disclosure provides a magnetic plate. The magnetic plate may be part of a wallet or other accessory, and includes magnets in specific locations to allow the wallet or other accessory to be selectively magnetically attached to (and detached from) another device, such as a mobile phone. Because mobile phones include complex circuitry, which may be negatively affected by strong magnetic fields, and often include magnets with specific functions that external magnetic fields can interfere with, the described magnetic plate balances the strength and positioning of the included magnets to enable two devices to be magnetically connected to one another without interfering with the operation of the other. In addition, embodiments of the present disclosure position the magnets in the accessory, and provide one or more metal plates or other materials in a plate on the electronic device to shield the electronic device from magnetic fields in the accessory.

As a result, the present disclosure in some embodiments advantageously permits a user to keep a mobile device next to a wallet or other carrying device, reducing the likelihood of those items becoming separated.

Additional features and advantages of the disclosed apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present disclosure provides a magnetic plate. The magnetic plate may be part of (either attached to or integrated in) a wallet or other accessory, and includes magnets in specific locations to allow the wallet to be selectively magnetically attached to (and detached from) another device, such as a mobile phone. Because mobile phones include complex circuitry, which may be negatively affected by strong magnetic fields, and often include magnets with specific functions that external magnetic fields can interfere with, the described magnetic plate disclosed herein balances the strength and positioning of the included magnets to enable two devices to be connected to one another without interfering with the operation of the other. In some embodiments, the described magnetic plate is configured to mount to another plate that protects electronic devices from magnetic fields, e.g., by using metal or other materials in positions corresponding to the magnets of the magnetic plate.

In each of the drawings of the present disclosure, a shared coordinate system is used (as indicated with the compasses in individual drawings) with X, Y, and Z directions to aid in understanding. Although a user may orient the described devices in various positions, various dimensions may be referred to as a width, a height, or a depth, which represent measurements on the X axis, Y axis, and Z axis, respectively.

Figure 1A:
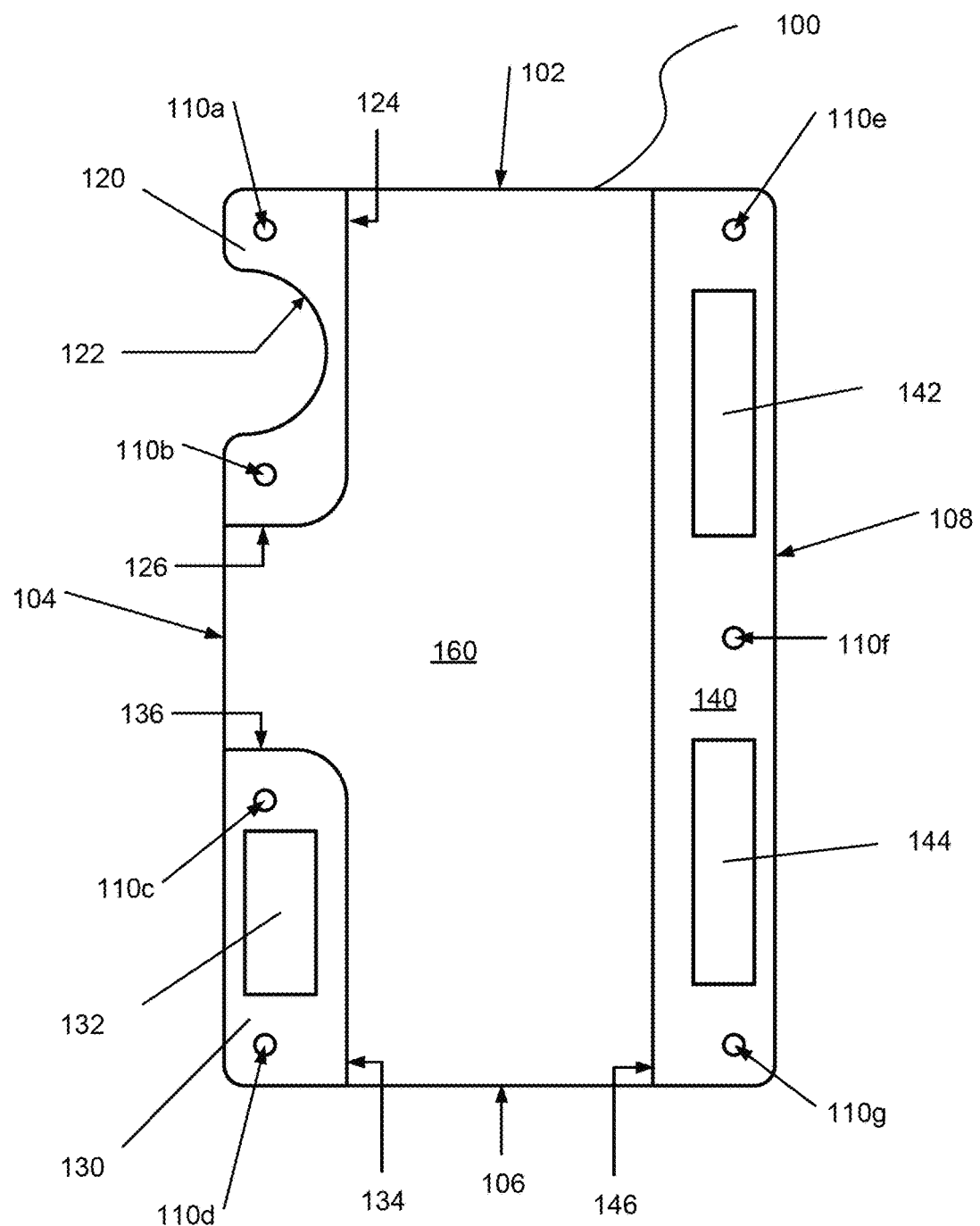
FIGS. 1A-1C illustrate frontal views of an example magnet plate, according to embodiments of the present disclosure.
Figure 1A:
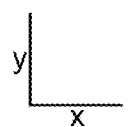
Figure 1B:
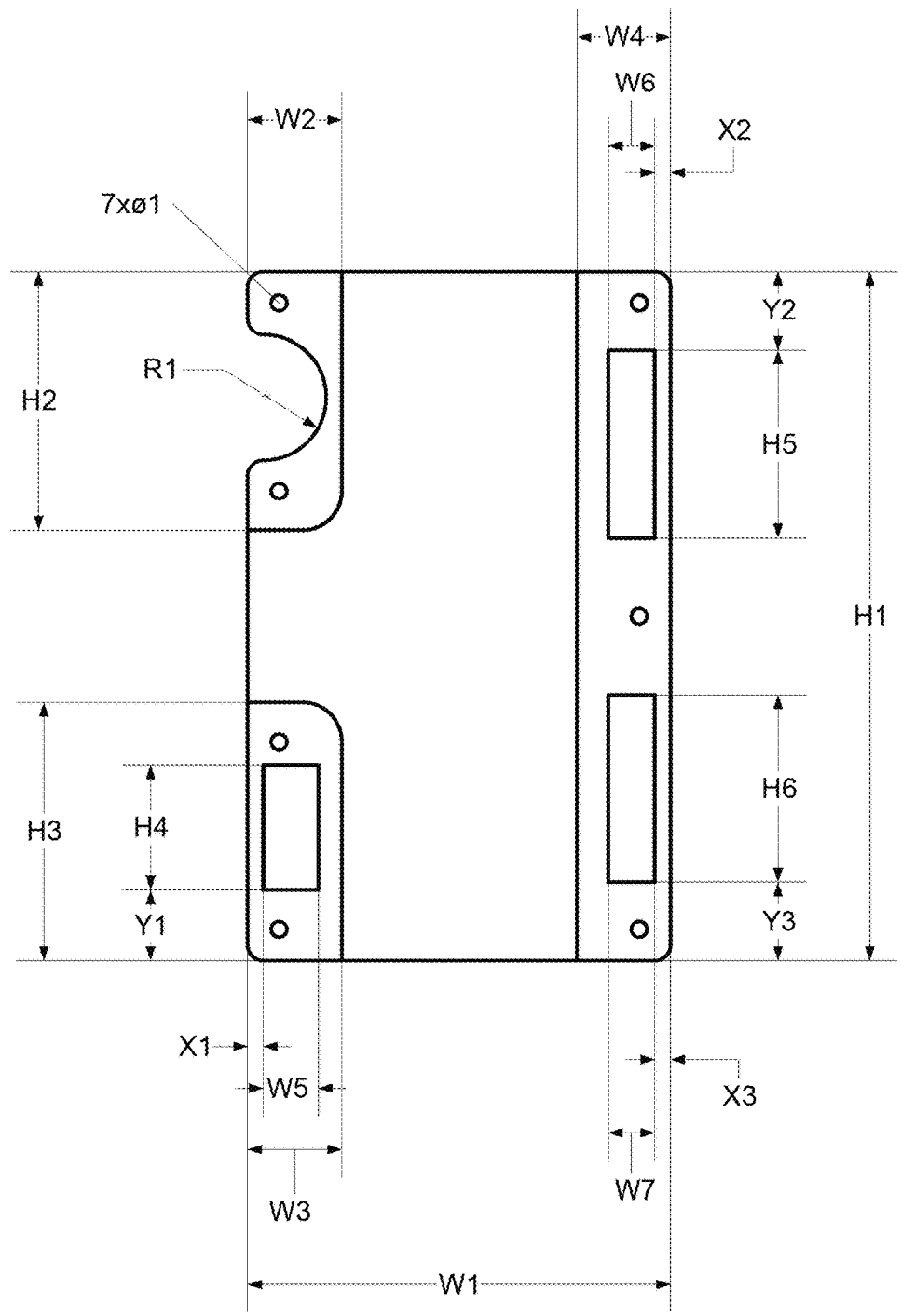
Figure 1C:
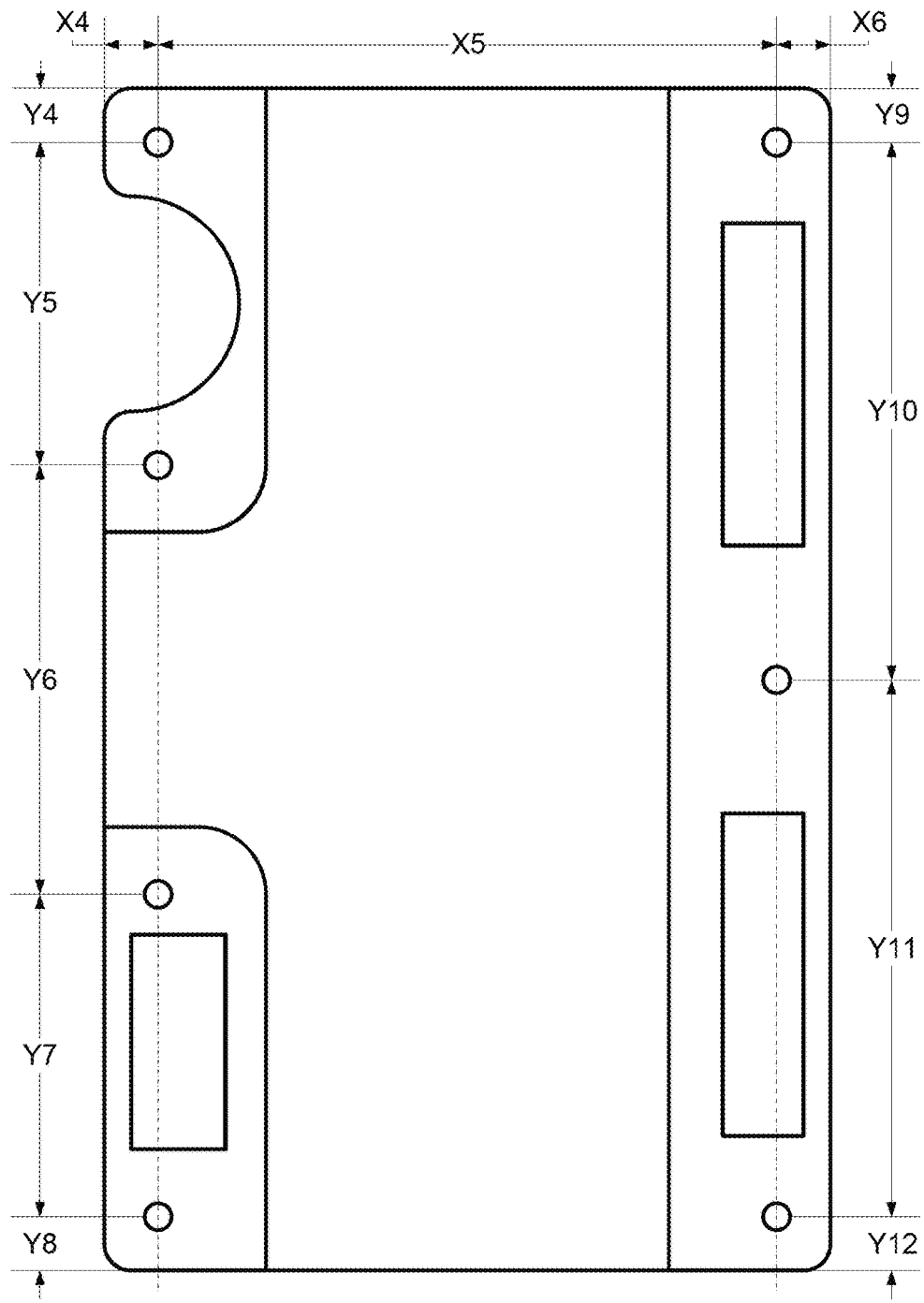

FIGS. 1A-1C illustrate a frontal view of an example magnet plate, with various features highlighted separately in each of FIG. 1A-1C for ease of understanding, according to embodiments of the present disclosure.

FIG. 1A illustrates a frontal view of an example magnetic plate 100, according to embodiments of the present disclosure, in which various parts of the magnetic plate 100 are introduced and described.

As illustrated, the magnetic plate 100 is formed of a base plate that has three protruding faces, each protruding face having further distinct features. The base plate is substantially a rectangular prism with two primary faces 160, 200 in the X-Y plane (See FIGS. 2A-D, 3), two lateral faces 104, 108 in the Y-Z plane, and two longitudinal faces 102, 106 in the X-Z plane. The three protruding faces 120, 130, 140 extend from the first primary face 160. The plate is described as being "substantially rectangular" as the intersections of the lateral and longitudinal faces are rounded, although squared corners are also contemplated. Additionally, although generally referred to as faces occupying a given plane, two or more of the faces may be joined at corner (e.g., at an angle of approximately 90 degrees) to one another, the present disclosure also contemplates that faces may be joined by various bevels or chamfers.

The first protruding face 120 extends out of first primary face 160 along the Z dimension, and shares a corner and portions of the first lateral face 104 and the first longitudinal face 102, and is bounded on opposite sides by a first resultant lateral face 124 and a first resultant longitudinal face 126. It may be noted that, as illustrated, the intersection of the resultant faces 124, 126 is rounded. The first protruding face 120 features a semicircular cutout 122, which is located on the side bounded by the first lateral face 104, the profile of which is in the X-Y plane and extends through the plate 100 in the Z dimension.

The second protruding face 130 extends out of first primary face 160 along the Z dimension, and shares a corner and portions of the first lateral face 104 and the second longitudinal face 106, and is bounded on opposite sides by a second resultant lateral face 134 and a second resultant longitudinal face 136. It may be noted that, as illustrated, the intersection of the resultant faces 134, 136 is rounded. The second protruding face 130 features a first magnet indentation 132 which extends into the second protruding face 130 and into or towards the magnetic plate 100 along the Z dimension.

The third protruding face 140 extends out of first primary face 160 along the Z dimension, and shares the second lateral face 108, portions of the first and second longitudinal faces 102, 106, and the corners thereof, and is bounded by a third resultant lateral face 146 opposite to the second lateral face 108. The third protruding face 140 features a second and third magnet indentation 142, 144 which extend into the third protruding face 140 and into or towards the magnetic plate 100 along the Z dimension.

The illustrated example includes seven through-holes 110a-110g (generally or collectively, through-hole 110). Through-holes 110a and 110b are located on the first protruding face 120, through-holes 110c and 110d are located on the second protruding face 130, and through-holes 110e-g are located on the third protruding face 140. Note that other embodiments may have more, or fewer, than the seven illustrated through-holes 110, as the application of the device demands.

FIG. 1B illustrates a frontal view of an example magnetic plate 100, according to embodiments of the present disclosure, according to embodiments of the present disclosure, in which some dimensions of relevant parts are shown. Plate 100 has a first width W1, which corresponds to the length of the longitudinal faces 102, 106. The Plate 100 has a first height H1, which corresponds to the lengths of the first and second lateral faces, 104, 108.

The first protruding face 102 has a second width W2 and a second height H2, which correspond to the lengths of the resultant longitudinal face 126 and the first resultant lateral face 124, respectively. The profile of the semicircular cutout 122 has a radius R1.

The second protruding face 130 has third width W3 and a third height H3, which correspond to the lengths of the second resultant longitudinal face 136 and the second resultant lateral face 134, respectively. The first magnet indentation 132 has fifth width W5 and fourth height H4, and is a first lateral distance X1 from first lateral face 104 and a first longitudinal distance Y1 from second longitudinal face 106.

The third protruding face 140 has a fourth width W4 and the first length H1. The second magnet indentation 142 has a sixth width W6 and fifth length H5, and is a second lateral distance X2 from second lateral face 108 and a sixth distance Y6 from first longitudinal face 102. The first magnet indentation 132 has seventh width W7 and sixth height H6, and is a third lateral distance X3 from the second lateral face 108 and a third longitudinal distance Y3 from the second longitudinal face 106.

The through-holes 110a-g have a diameter of φ1. In some embodiments, the through-holes 110 may be threaded to accommodate a screw or other threaded fastener, and may be configured in other ways to accommodate other types of fasteners. Although illustrated with a shared or equivalent diameter, the present disclosure contemplates that one or more of the through-holes 110 may have different diameters from other through-holes 110 in the magnetic plate 100.

FIG. 1C illustrates a frontal view of an example magnetic plate 100, according to embodiments of the present disclosure, in which the some of the relative dimensions of the through-hole locations are shown. Note that all dimensions pertaining to the locations of the through-holes 110 are relative to the center points thereof. The first through fourth through-holes 110a-d share a common first axis parallel to first lateral face 104, the first axis being a fourth lateral distance X4 from the first lateral face 104. Along this first axis, the first through-hole 110a is a fourth longitudinal distance Y4 from the first longitudinal face 102, the second through hole 110b is a fifth longitudinal distance Y5 from the first through-hole 110a, the third through-hole 110c is a sixth longitudinal distance Y6 from the second through-hole 110b, and the fourth through-hole 110d is a seventh longitudinal distance Y7 from the third through hole 110c, and also an eighth longitudinal distance Y8 from the second longitudinal face 106.

Fifth through seventh through-holes 110e-g share a second common axis, parallel to the first axis, and to the second lateral face 108, the second axis being a distance X12 from the second lateral face 108. Along this second axis, through-hole 110f is a ninth longitudinal distance Y9 from first longitudinal face 102, through-hole 110e is a tenth longitudinal distance Y10 from through-hole 110f, through-hole 110g is an eleventh longitudinal distance Y11 from through-hole 110e, and is a twelfth longitudinal distance Y12 from second longitudinal face 106. The first axis and second axis are an eleventh lateral distance X11 from one another.

Figure 2A:
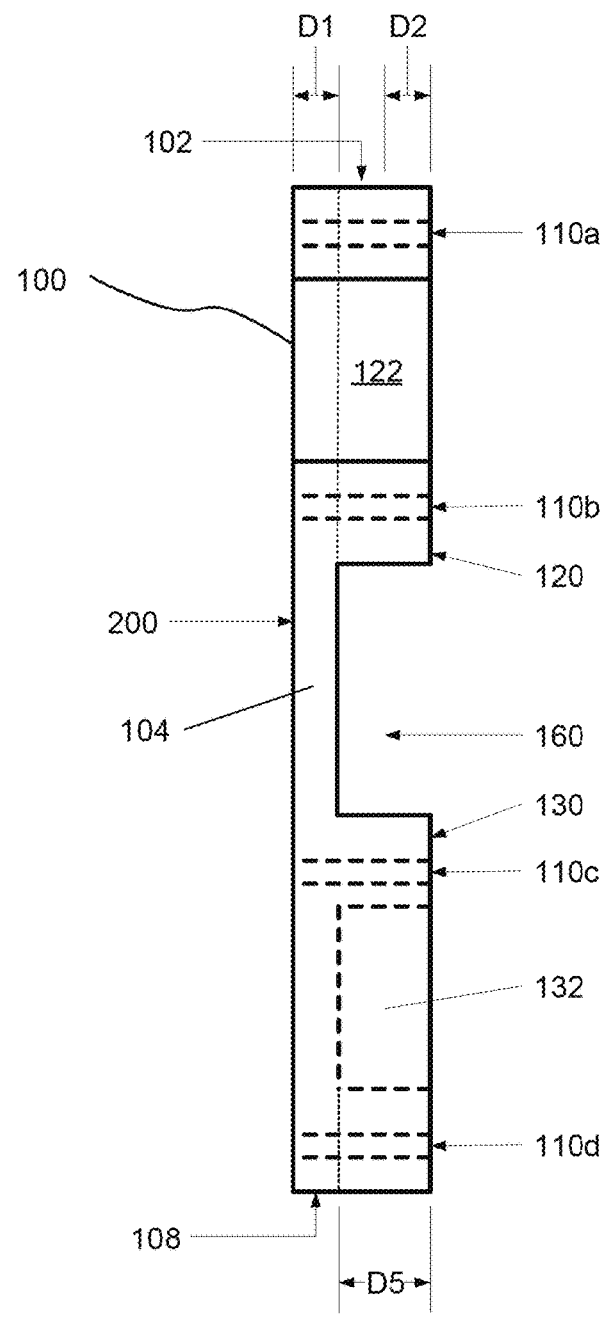
FIGS. 2A-2D illustrate lateral views of an example magnet plate, according to embodiments of the present disclosure.

FIG. 2A illustrates a lateral view of an example magnetic plate 100, according to embodiments of the present disclosure, such that FIG. 2A is a frontal view of the first lateral face 104, in which some relevant dimensions are shown. The plate 100 has thickness D1, and the protruding faces 120, 130, and 140 (the third protruding face 140 not visible in FIG. 2A) extend out of or away from the first primary surface 160 by a distance D2 along the Z dimension. The first magnet indentation 132 has a first depth D5 with respect to the second protruding face 130. The face opposite the first primary face 160 is the second primary face 200.

Figure 2B:
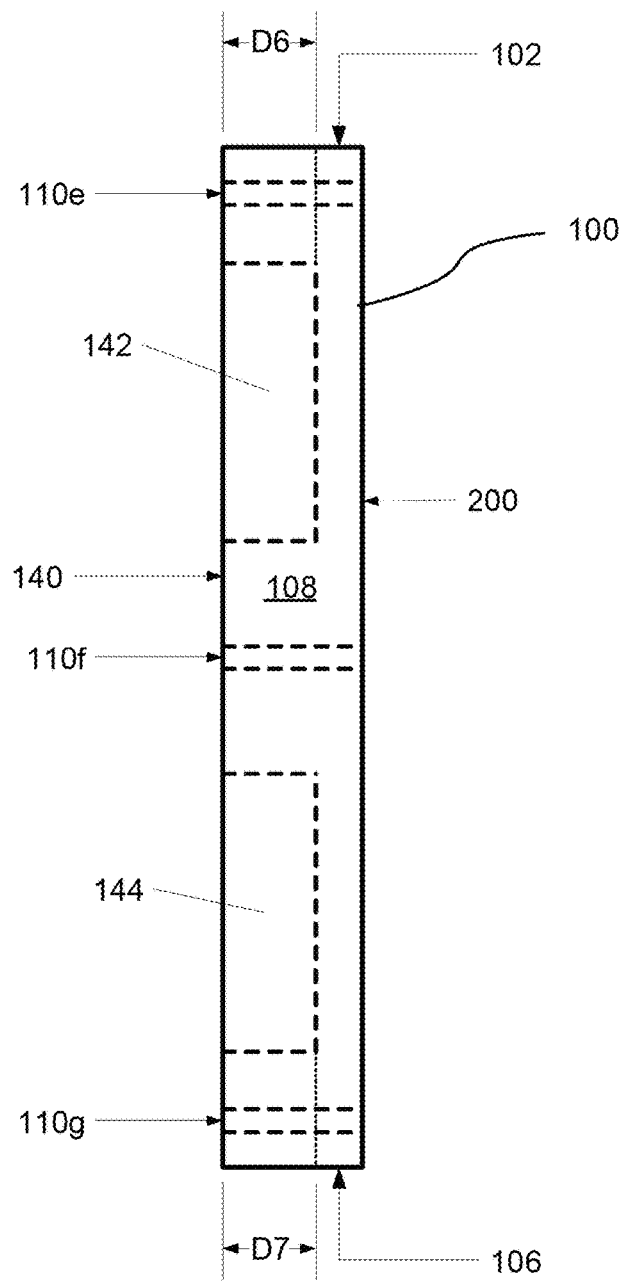
Figure 2B:
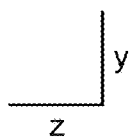

FIG. 2B represents a lateral view of an example magnetic plate 100, according to embodiments of the present disclosure, such that FIG. 2B is a frontal view of the second lateral face 108, in which some relevant dimensions are shown. The second magnet indention 142 has a second depth D6 and the third magnet indentation 144 has a third depth D7, both with respect to the third protruding face 140.

Figure 2C:
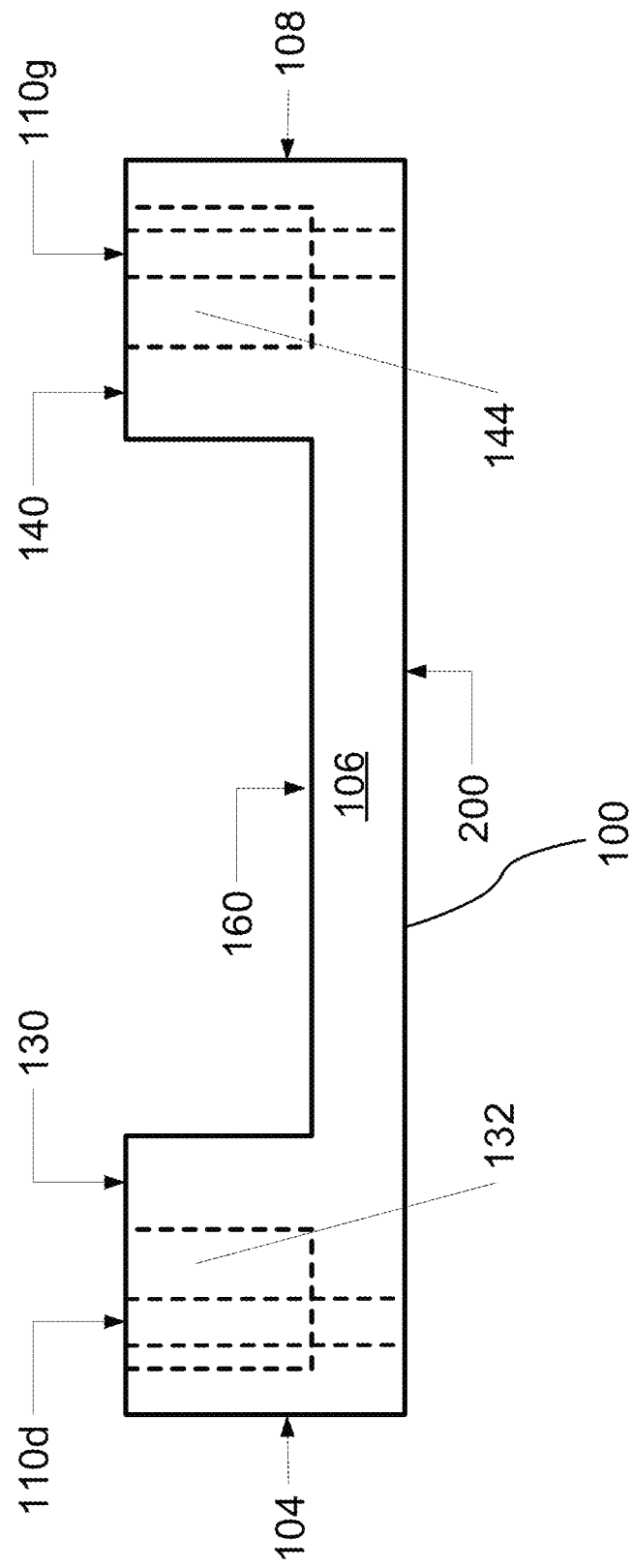
Figure 2D:
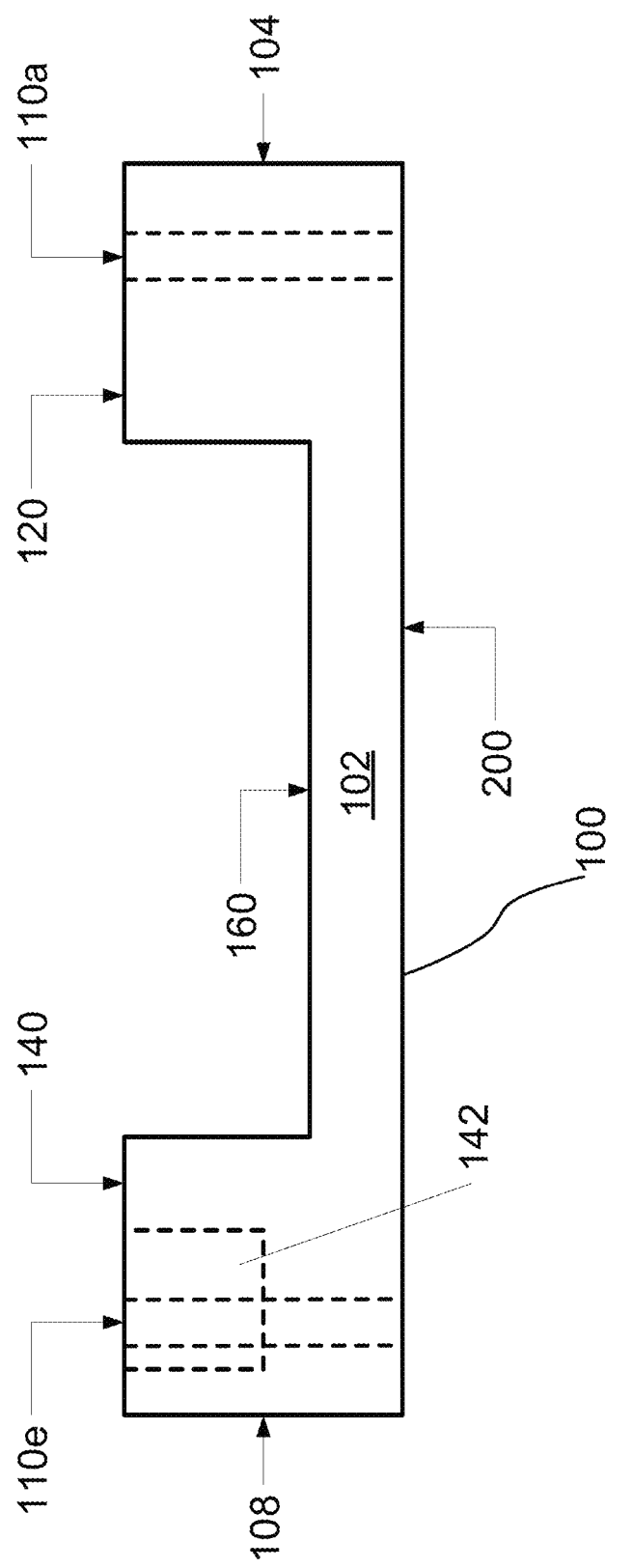

FIGS. 2C and 2D represent longitudinal views of an example magnetic plate 100, according to embodiments of the present disclosure, such that FIG. 2C is a frontal view of the second longitudinal face 106, and FIG. 2D is a frontal view of the first longitudinal face 102.

Figure 3:
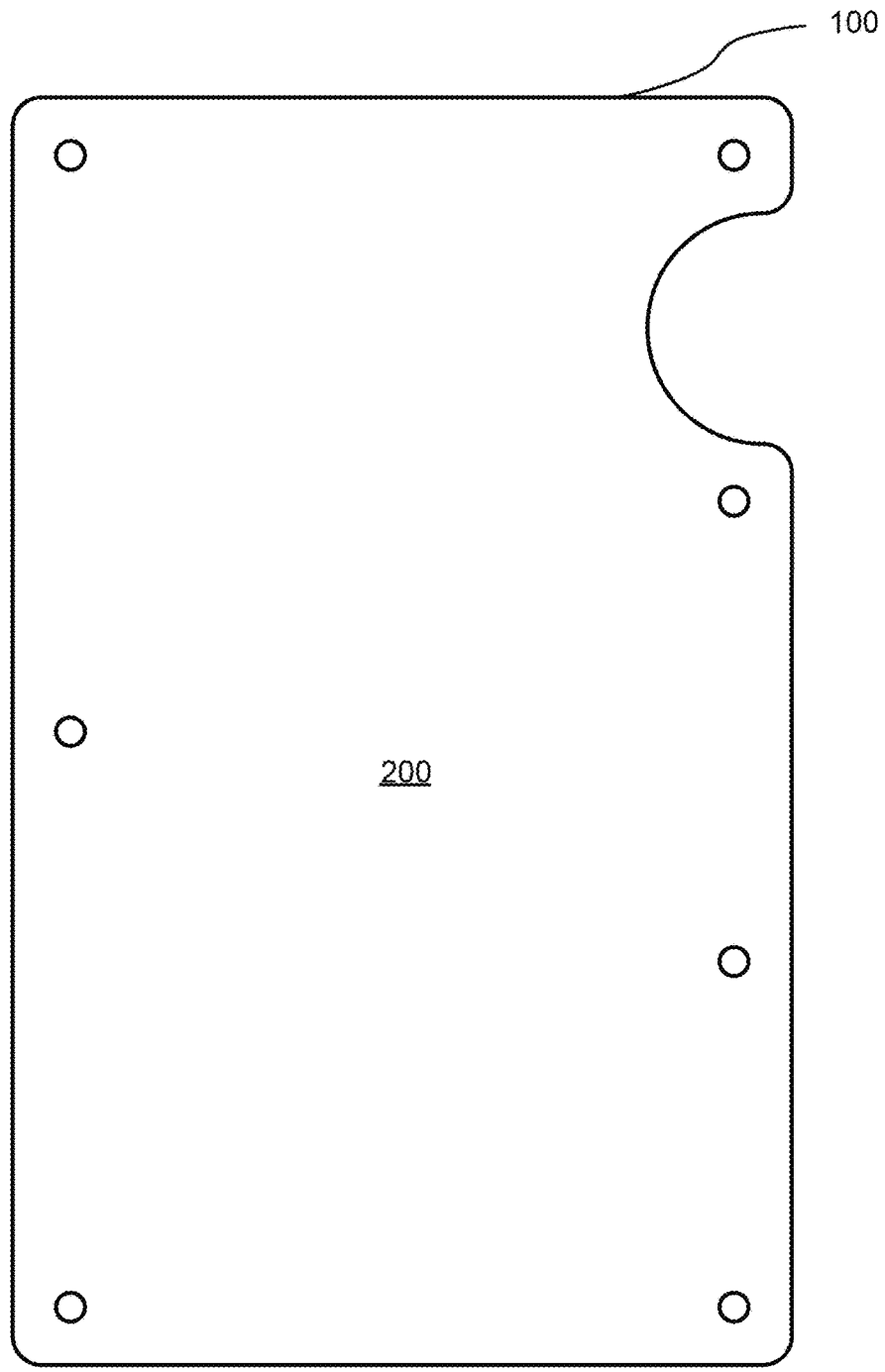
FIG. 3 illustrates a rear view of an example magnet plate, according to embodiments of the present disclosure.

FIG. 3 is a rear view of an example magnetic plate 100, according to embodiments of the present disclosure, such that FIG. 3 is a frontal view of the second primary face 200. The second primary face 200 is a flat surface configured to enable communication with another surface. For example, a mobile phone, or similar electronic device.

The magnetic plate 100 can be constructed of one of, or a combination of any of a number of materials, which include, but are not limited to: aluminum, carbon fiber, wood, bamboo, plastic, glass, or any other non-ferromagnetic material.

Figure 4A:
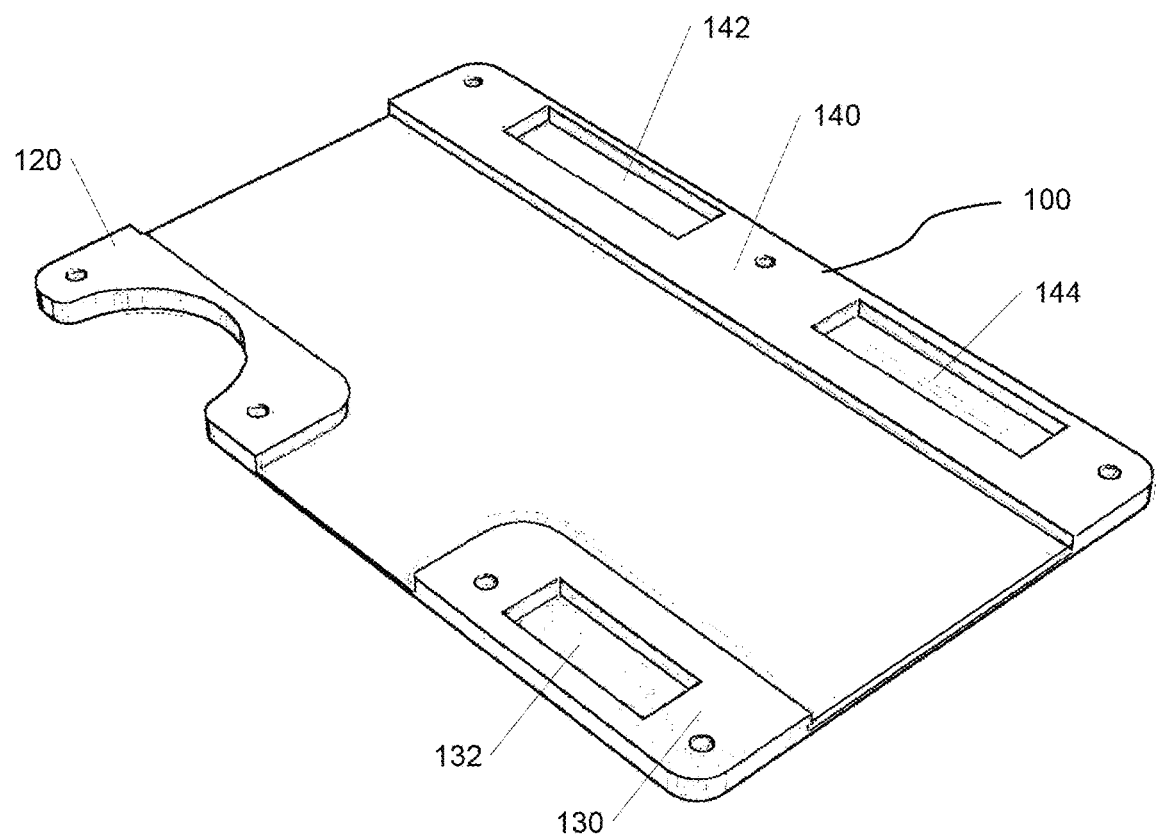
FIG. 4A-B are isometric views of an example magnetic plate, according to embodiments of the present disclosure.

FIG. 4A illustrates an isometric view of an example magnetic plate 100, according to embodiments of the present disclosure. The protruding faces 120, 130, 140 extend to a shared plane that defines a flat surface to enable communication with another surface. The magnet indentations 132, 142, 144 are configured such that when magnets are disposed within the respective magnet indentations 132, 142, 144, the surfaces of the magnets are level with, or lie below, the flat surface of the protruding faces 120, 130, 140.

The magnet indentations 132, 142, 144 may take any number of shapes and sizes, so as to accommodate any given shape of magnet. For example, the magnets may be bar shaped, disc shaped, cylindrical, ring shaped, or otherwise irregularly shaped, with the magnet indentations 132, 142, 144 being shaped to securely contain the desired magnets.

Figure 4B:
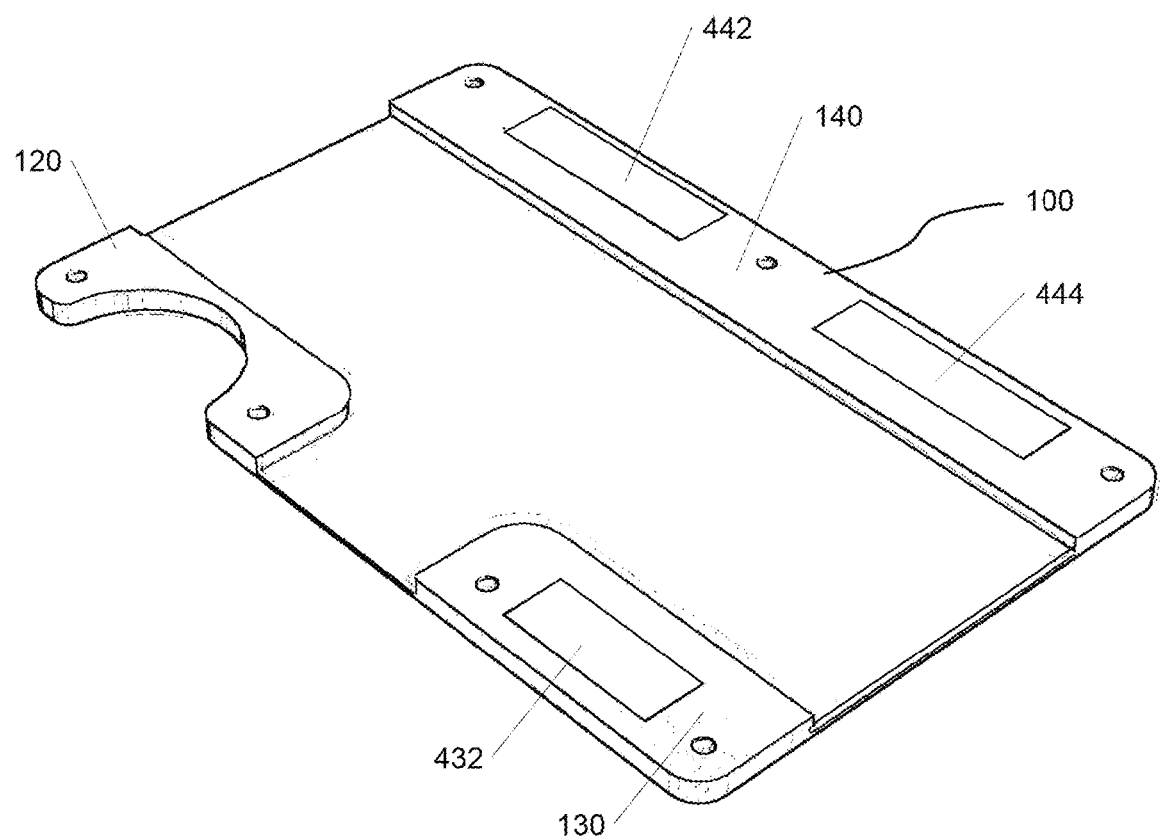

FIG. 4B illustrates an isometric view of an example magnetic plate 100, according to embodiments of the present disclosure, with the magnets 432, 442, 444 disposed within the magnet indentations 132, 142, 144.

The magnetic plate 100, being substantially rectangular, comprises four corners. Three of the corners are magnetized, (magnetized, in this instance, meaning having magnets disposed within them) via the associated magnets 432, 442, 444 held in the correspondingly located magnet indentations 132, 142, 144, and one corner is not magnetized.

In some embodiments, the magnets 432, 442, and 444 have a height in the Z-direction that is slightly larger than the depth of the magnet indentations 132, 142, 144 in which the magnets 432, 442, and 444 are disposed. In such embodiments, a corresponding plate mounted to the back of another device (e.g., a mobile phone) has indentations corresponding in location and X/Y dimension to the locations and dimensions of the magnets 432, 442, and 444. However, the indentations in the plate are also dimensioned, in some embodiments, to have a depth in the Z dimension that is equal to or larger than the extent to which the magnets 432, 442, and 444 extend above the magnetic plate 100 in the Z dimension. In such embodiments, this arrangement provides a "keying" feature, in that the magnetic plate 100 can only be attached to the device in a particular orientation, and the mechanical interlock of the magnets 432, 442, and 444 with the indentations ensures such proper orientation.

In other embodiments, the magnets 432, 442, and 444 have a height in the Z-dimension that is slightly smaller than the depth of the magnet indentations 132, 142 and 144, and corresponding magnets in the device (e.g., a mobile phone) may protrude from the surface of the device. This arrangement likewise provides a "keying" feature, where the protruding magnets in the device (e.g., the mobile phone) mechanically prohibit the magnetic plate 100 of, for example, the wallet, from being installed in an incorrect orientation.

In some embodiments, a combination of keying features is used. That is, in some embodiments, certain magnets in the wallet extend beyond the outer surface of the wallet and engage with certain indentations in the mobile phone, and certain magnets in the mobile phone extend beyond the outer surface of the mobile phone and engage with certain indentations of the wallet.

The magnets may be any type of permanent magnet, such as, but not limited to permanent magnets made from: neodymium iron boron (NdFeB), samarium cobalt (SmCo), alnico, ceramic or ferrite magnets, and combinations thereof.

In some embodiments the dimensions of certain features may be the same as the dimensions of other features or have certain ratios that improve the selective magnetic attachment of the plate to another device.

In some embodiments the magnet indentations 132, 142, 144 have the same dimensions as one another, such that the fifth, sixth and seventh widths are equivalent, W5=W6=W7, the fifth, sixth and seventh heights are equivalent, H5=H6=H7, or the first, second and third depths are equivalent, D1=D2=D3. In some embodiments the magnet indentations 132, 142 and 144 have the same distances to the most proximate lateral and longitudinal faces thereof, such that the first, second and third longitudinal distances are equivalent, Y1=Y2=Y3 and the first, second and third lateral distances are equivalent, X1=X2=X3.

In some embodiments the distances of through-holes to the most proximate lateral and longitudinal faces are equidistant, such that the fourth, eighth, ninth and twelfth longitudinal distances are equivalent, Y4=Y8=Y9=Y12, and the fourth and sixth lateral distances are equivalent, X4=X6. In some embodiments, through-holes that share an axis are evenly distributed along the axis, such that the fifth and seventh longitudinal distances are equivalent, Y5=Y7 and the tenth and eleventh longitudinal distances are equivalent, Y10=Y11.

In some embodiments, the protruding faces 120, 130, 140 share dimensions, such that the second, third and fourth widths are equivalent, W2=W3=W4, and the second and third heights are equivalent, H2=H3.

Figure 5:
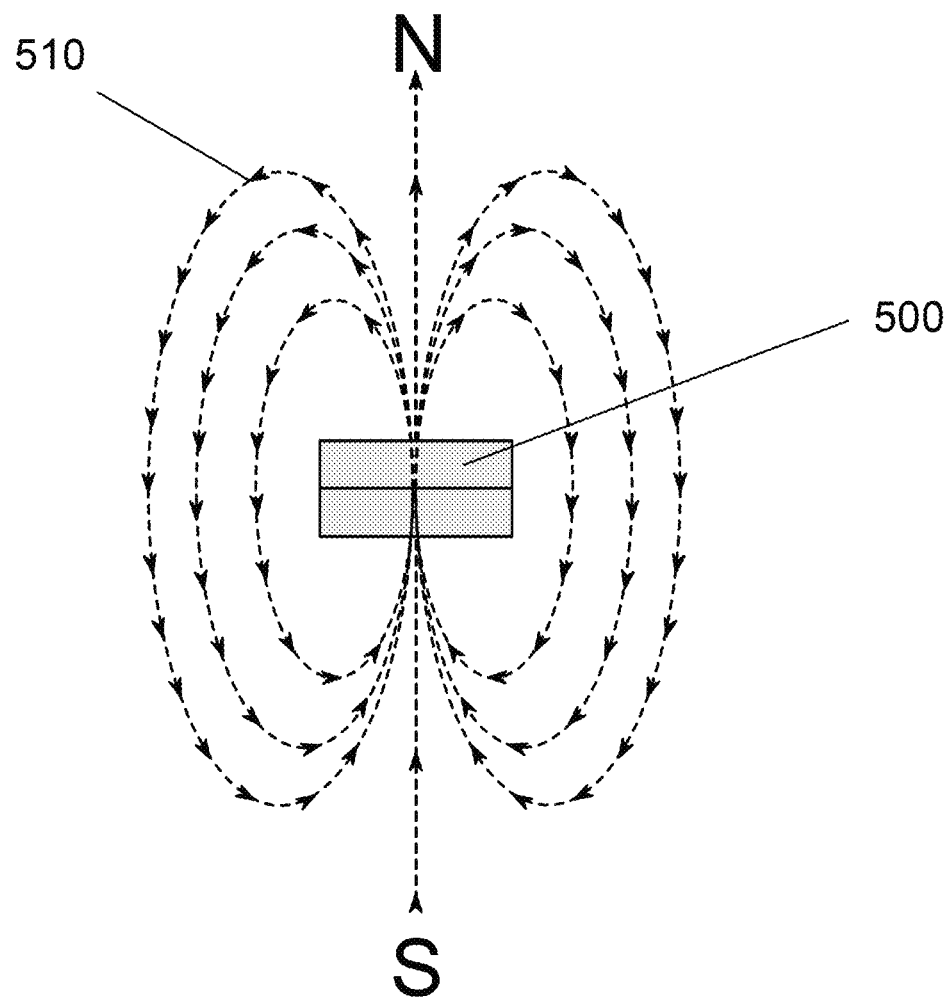
FIG. 5 illustrates the magnetic field generated by a bar magnet, according to embodiments of the present disclosure.

FIG. 5 illustrates the magnetic field 510 of an example magnet 500, according to embodiments of the present disclosure. The magnet 500 is shown in cross-section, with a magnetic field 510 that propagates between a north pole and a south pole that define a magnetic axis for the magnet 500. When oriented orthogonally with the magnetic plate illustrated herein, the magnetic poles of the magnets are substantially parallel to the Z axis.

The magnet 500 may represent any type of permanent magnet, such as, but not limited to permanent magnets made from: neodymium iron boron (NdFeB), samarium cobalt (SmCo), alnico, ceramic or ferrite magnets, and combinations thereof. In various embodiments, the magnet 500 may be constructed from several smaller magnets as a magnetic array, or a composite collection of magnets. As a permanent magnet, the magnet 500 maintains the magnetic field 510 without requiring the input of an electrical current, but maintains the magnetic field 510 even when inconvenient to the user, or potentially generating interference or inducing a current in another device. However, the magnetic field strength of the magnet 500 decreases at the square of distance from the surfaces of the magnet 500. Accordingly, by dimensioning the magnet 500 and the magnetic field 510 thereof, a designer can select a magnet 500 that have a field strength of X at a surface thereof and exhibits a field strength of Y at some distance from the surface of the magnetic 500 to thereby exhibit an apparent field strength having the ratio X:Y. This apparent field strength ratio may be used to ensure that circuitry, electrical components, or other magnets with certain sensitivities are located in the region where the magnetic field strength is equal to or less than Y, while the binding location for the magnet 500 and another surface is greater than Y.

Similarly, because the magnet 500 is held in a respective indentation and does not make direct physical contact with the object that the magnet 500 is used to magnetically couple the plate 100 to, a designer may dimension the magnet to have a field strength of Z at a binding location between a surface of the plate 100 and a surface of the object (held inline with the magnetic axis of the magnet 500). This magnetic field strength Z can be compared in a ratio with a magnetic field strength Y at a target area on the object (also between a surface of the plate 100 and a surface of the object) so that the apparent field strength ratio Z:Y is above a predefined ratio (while ensuring Y has an absolute value less than a magnetic senility threshold in the target area).

Figure 6:
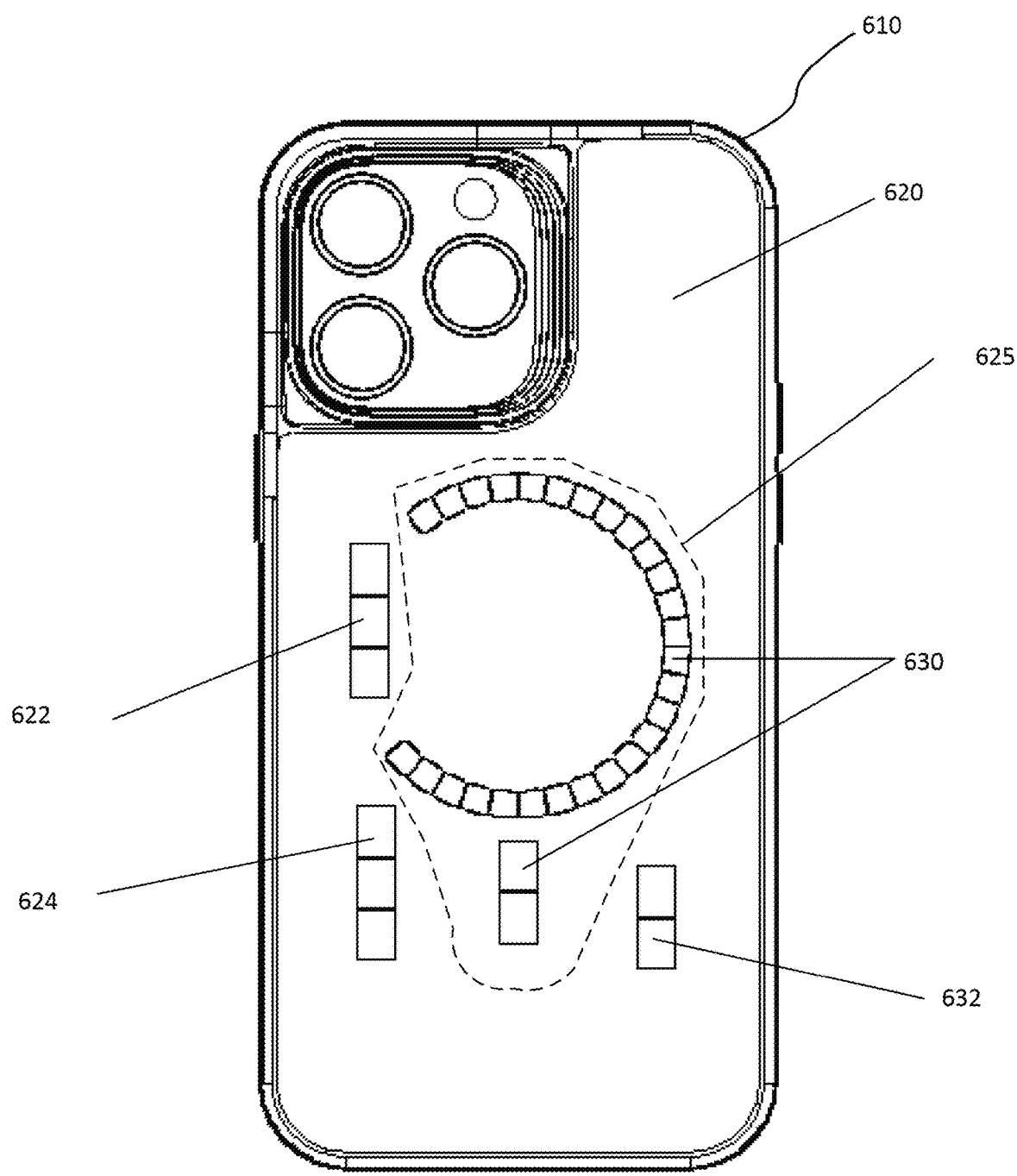
FIG. 6 illustrates an example mobile device with magnetically engaged components.

FIG. 6 illustrates an example mobile device with magnetically engaged components, according to embodiments of the present disclosure. Although illustrated in FIG. 6 as a mobile phone with a case, the present disclosure contemplates that the target device 610 may be various sorts of devices, (such as but not limited to: mobile phones, tablets, laptops, or slate computers, and other computing devices, or a case disposed on any of the previously mentioned devices) that include magnetically engaged circuitry 630 in a target area 625 on a contact surface 620 of the target device 610. The magnetically engaged circuitry 630 may be configured in various arrangements, such as the example shown in FIG. 6 as an arc and a rectangle, but other arrangements are contemplated in the present disclosure. The outer bounds of the area on the contact surface 620 occupied by the magnetically engaged circuitry is referred to herein as the target area 625.

FIG. 6 further illustrates locking magnets 632, 622, 624 with which plate magnets 432, 442, 444 magnetically engage in order to secure the plate 100 to the contact surface 620. In some embodiments, the locking magnets 632, 622, 624 may be omitted or replaced by non-magnetized ferromagnetic elements to which the plate magnets 432, 442, 444 magnetically engage with to secure the plate 100 to the contact surface, or may be omitted when the contact surface 620 or an underlying surface is made of a non-magnetized ferromagnetic material. The locking magnets 632, 622, 624 may be preexisting components of a mobile device, or may be components of a case for a device, constructed for the purpose of attaching a magnetic plate 100 to the target device 610.

In some embodiments, such as those described above where the contact surface 620 includes indentations or openings that perform a "keying" function, the indentations or openings may correspond to the positions of locking magnets 632, 622, and 624. That is, the locking magnets may be positioned within the contact surface 620 such that the outer-most surface of the magnets is below the outermost surface of the contact surface 620. In some embodiments, the contact surface 620 is a separate plate that is mounted to (e.g., by adhesive or by magnets) the target device 610. In such embodiments, the magnets 632, 622, and 624 may be positioned within the material of the separate plate 620, and may advantageously be positioned with indentations so that corresponding magnets on the wallet portion engage both magnetically and mechanically with such magnets.

Figure 7:
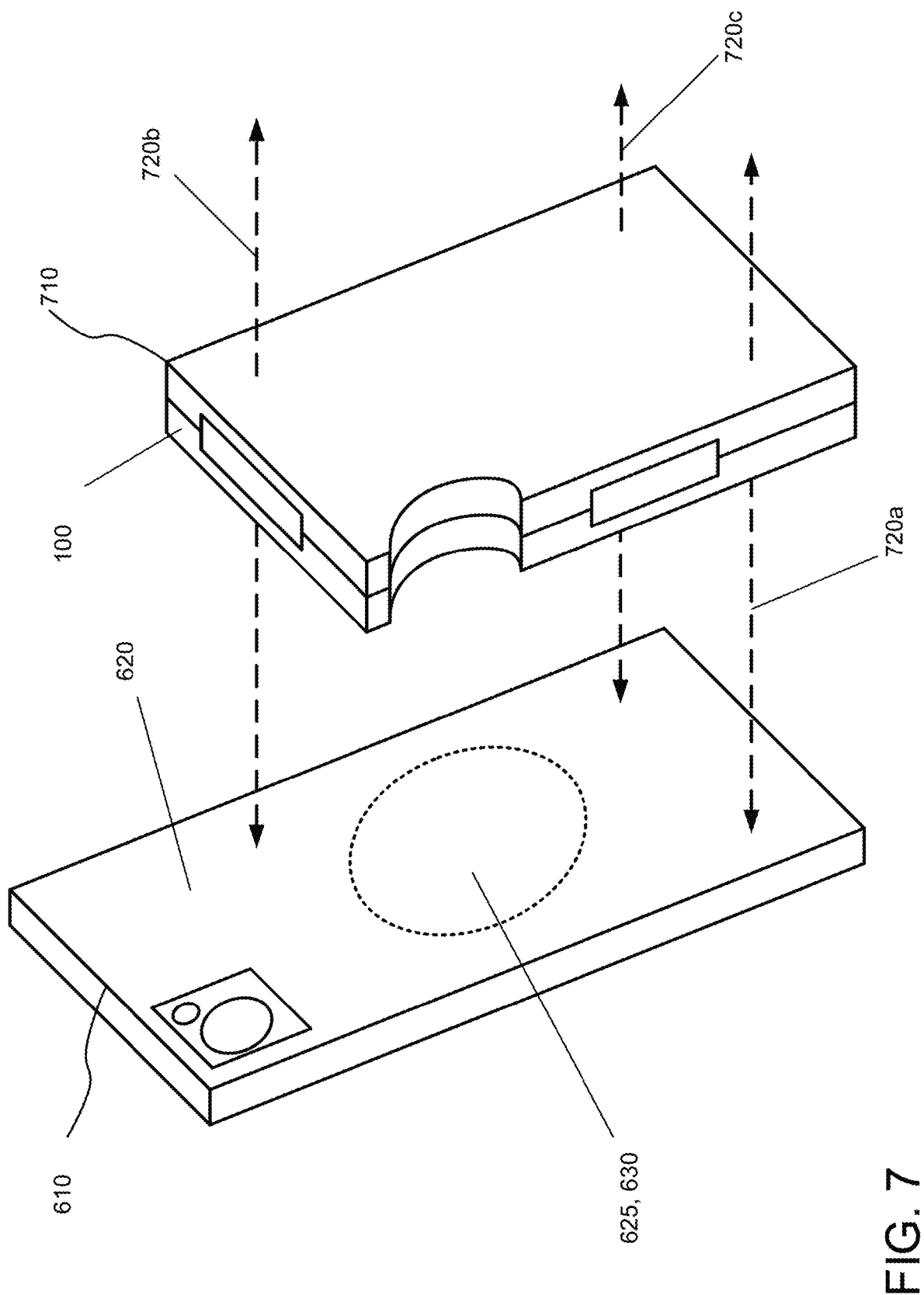
FIG. 7 illustrates an example magnet plate interacting with an example mobile device that includes magnetic elements, according to embodiments of the present disclosure.

FIG. 7 illustrates an example magnet plate 100 interacting with an example mobile device that includes magnetic elements, according to embodiments of the present disclosure. The magnet plate 100 may be part of a first device 710, such as a wallet, that is magnetically coupled with a target device 610. Although illustrated in FIG. 6 as a mobile phone, the present disclosure contemplates that the target device 610 may be various sorts of devices (such as, but not limited to: tablet, laptop, or slate computers) that include magnetically engaged circuitry 630 in a target area 625 on a contact surface 620 the target device 610. As used herein, the terms, "magnetic coupling", "magnetically coupled", and variations thereof refer to an interactive state between two devices where movement of one device causes movement in the other device (e.g., a user may pick up both the first device 710 and the target device 610 when magnetically coupled despite only holding one of the devices, a user may impart a spin on one device to spin both devices, etc.). To avoid confusion, mere magnetic attraction/repulsion or other magnetic effects do not describe magnetic coupling. Magnetically coupling may be selectively engaged or disengaged between the two devices (e.g., by bringing the two devices within a given proximity, pulling the two devices apart, etc.) without permanently affecting the structural integrity of the devices or the ability to re-couple magnetically with one another.

The contact surface 620 of the target device 610 may be part of an external case applied to the target device 610 or may be a factory-original surface of the target device 610, either of which may be referred to as part of a housing (e.g., a housing contact surface 620) for the target device 610.

In various embodiments, the magnetically engaged circuitry 630 may be used to align various accessories with other circuitry or electronics (e.g., to wirelessly charge the target device 610), hold an accessory to the target device 610 (e.g., a case), or communicate information to the target device 610 (e.g., a magnetically-coded key).

To avoid the plate magnets 432, 442, 444 of the magnet plate 100 interfering with or unintentionally interacting with the magnetically engaged circuitry 630 while still ensuring a firm grip between the coupled devices, the magnet plate 100 locates the plate magnets 432, 442, 444 according to the relative field strengths of the plate magnets 432, 442, 444 at various positions relative to the target device 610. As the individual magnetic fields of the plate magnets 432, 442, 444 decrease in strength at the square of distance, and may optionally be oriented to negatively interfere with the magnetic fields of one another, the plate magnets 432, 442, 444 exhibit stronger individual magnetic field strengths closer to the indentations 132, 142, 144, and a weaker net magnetic field strength closer to the target area.

Accordingly, when the first device 710 and the target device 610 are magnetically coupled via the plate contact surface formed by second primary face 200 and the housing contact surface 620, the first indentation 132, the second indentation 142, and the third indentation 144 are located such that a net magnetic field generated by the plate magnets 432, 442, 444 have sufficient strength to magnetically couple the first device 710 to the target device 610. However, in the target area 625, the net magnetic field generated by the plate magnets 432, 442, 444 is below a magnetic sensitivity threshold (e.g. less than 1500, 1000, 500, 100, 50, 10, or 5 millitesla (mT)) to activate or otherwise engage the magnetically engaged circuitry 630 of the target device 610. Stated differently, the distances from the indentations to the target area 625 and the competing magnet fields from the individual plate magnets 432, 442, 444 serve to reduce the effect of the net magnetic field on the magnetically engaged circuitry 630.

Similarly, by placing the plate magnets 432, 442, 444 outside of the target area 625, the effect of the magnetically engaged circuitry 630 on the gripping strength of the plate magnets 432, 442, 444 is reduced, thereby ensuring that the magnets 432, 442, 444 can maintain a firm grip between the plate contact surface and the housing contact surface 620 of at least a predefined force.

Accordingly, the magnetic axes 720*a-c* of the plate magnets 432, 442, 444 are oriented to have a first polarity directed orthogonally outward from the respective indentations 132, 142, 144 and a second polarity directed orthogonally inward (e.g., towards a prospective housing contact surface 620) to have a stronger coupling force in a contact area with a prospective housing contact surface 620 than in an area that would overlap a target area 625 for magnetically engaged circuitry 630 of a prospective target device 610. The magnetic fields of the plate magnets 432, 442, 444 are thereby focused and directed to magnetically engage with the target device 610 outside of the target area 625, and reduce the field strength applied to the target area 625, while providing increased magnetic coupling force. In various embodiments, one of the plate magnets 432, 442, 444 is oriented to have an opposing polarity to the other two of the plate magnets 432, 442, 444 (e.g., one north pole facing the target device 610 and two south poles facing the target device 610 or one south pole facing the target device 610 and two north poles facing the target device 610).

Figure 8:
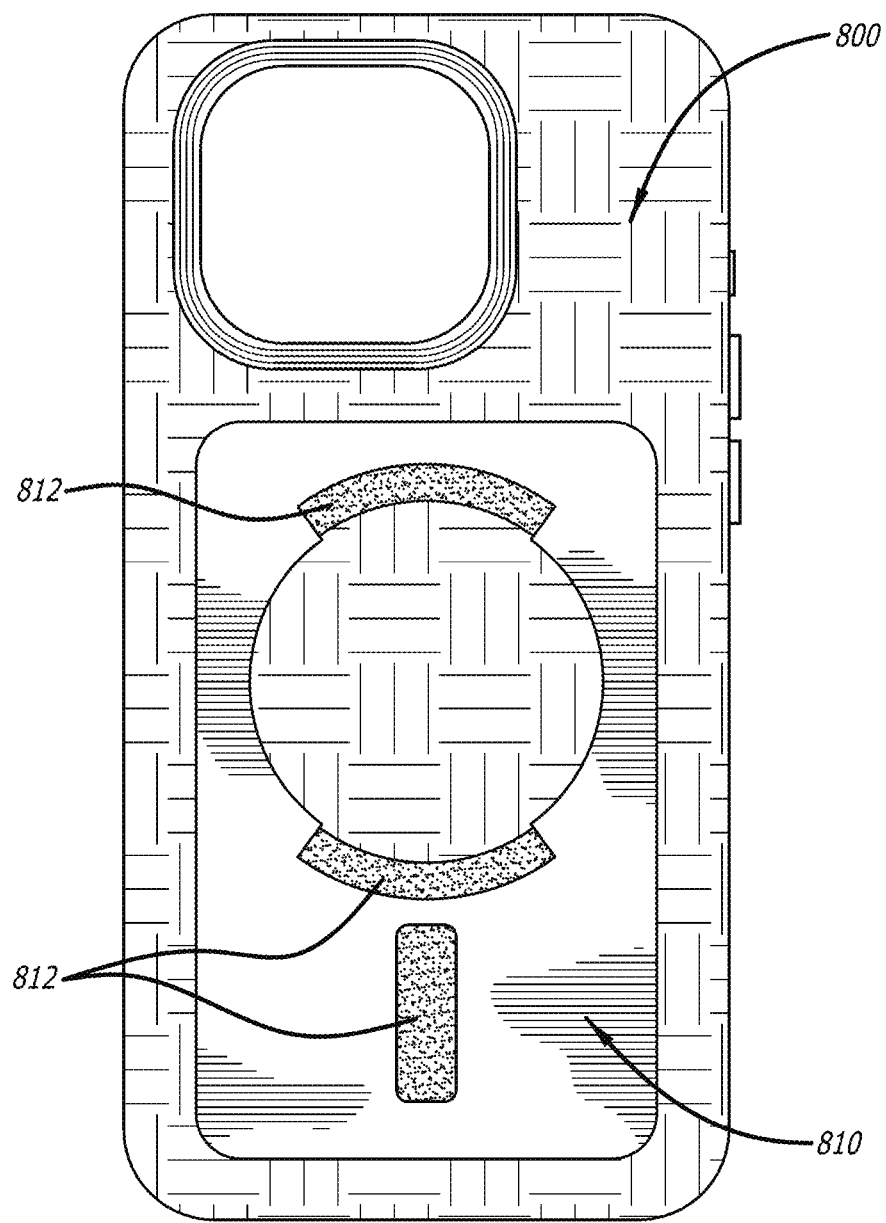
FIG. 8 illustrates a plate that can be mounted to the back of a device, such as a mobile phone, and provide magnetic engagement for a wallet or other auxiliary device, according to embodiments of the present disclosure.

FIG. 8 illustrates a plate that can be mounted to the back of a device, such as a mobile phone, and provide magnetic engagement for a wallet or other auxiliary device, according to embodiments of the present disclosure. FIG. 8 shows a case 800 for a mobile device, such as a cell phone. The case 800 is sized and shaped to engage the exterior of a mobile device, and is intended to be installed and used with a mobile device. Plate 810 is affixed to or integrated with the case 800 in various embodiments. In some embodiments wherein the plate 810 is affixed to the case, the plate 810 is molded to, welded to, adhered to, or magnetized to the case 800, as is appropriate. In some embodiments, the plate 810 is integrated into the case 800, such as by being injection molded with the case 800, permanently welded or adhered to the case 800, or attached in another appropriate way.

As illustrated in FIG. 8, the plate 810 includes a plurality of metallic areas 812 that are sized and shaped to correspond to metallic areas on an associated wallet product (not shown). Accordingly, the metallic areas of the plate 810 (whether magnetized or not) may magnetically engage with metallic areas of the wallet (whether magnetized or not). Thus, whether the areas 812, the corresponding areas of the wallet, or both, are magnetized, the areas 812 provide magnetic attachment between the plate 810 of the case 800 and a (unillustrated) wallet or other accessory. In addition, in some embodiments, the areas 812 are arranged such that a wallet/accessory with corresponding metallic areas can only be positioned in one orientation with respect to the case 800.

As illustrated, the metallic areas 812 are indented into the plate 810, as can be seen. That is, the outermost surface of the plate 810 is above the metallic surfaces 812 in the Z-direction as illustrated in FIG. 8. The present disclosure contemplates that a corresponding wallet or other accessory would have metallic areas (e.g., magnets) that protrude from the outer surface of the wallet/accessory, such that the protruding metallic areas of the wallet/accessory magnetically and mechanically engage the areas 812 of the plate 810. This cross-engagement between the plate 810 and an accessory is an example of the "keying" concept described herein, and ensures that the accessory will not mechanically mate with the plate 810 unless and until the accessory and plate 810 are in the appropriate orientation relative to one another.

Figure 9:
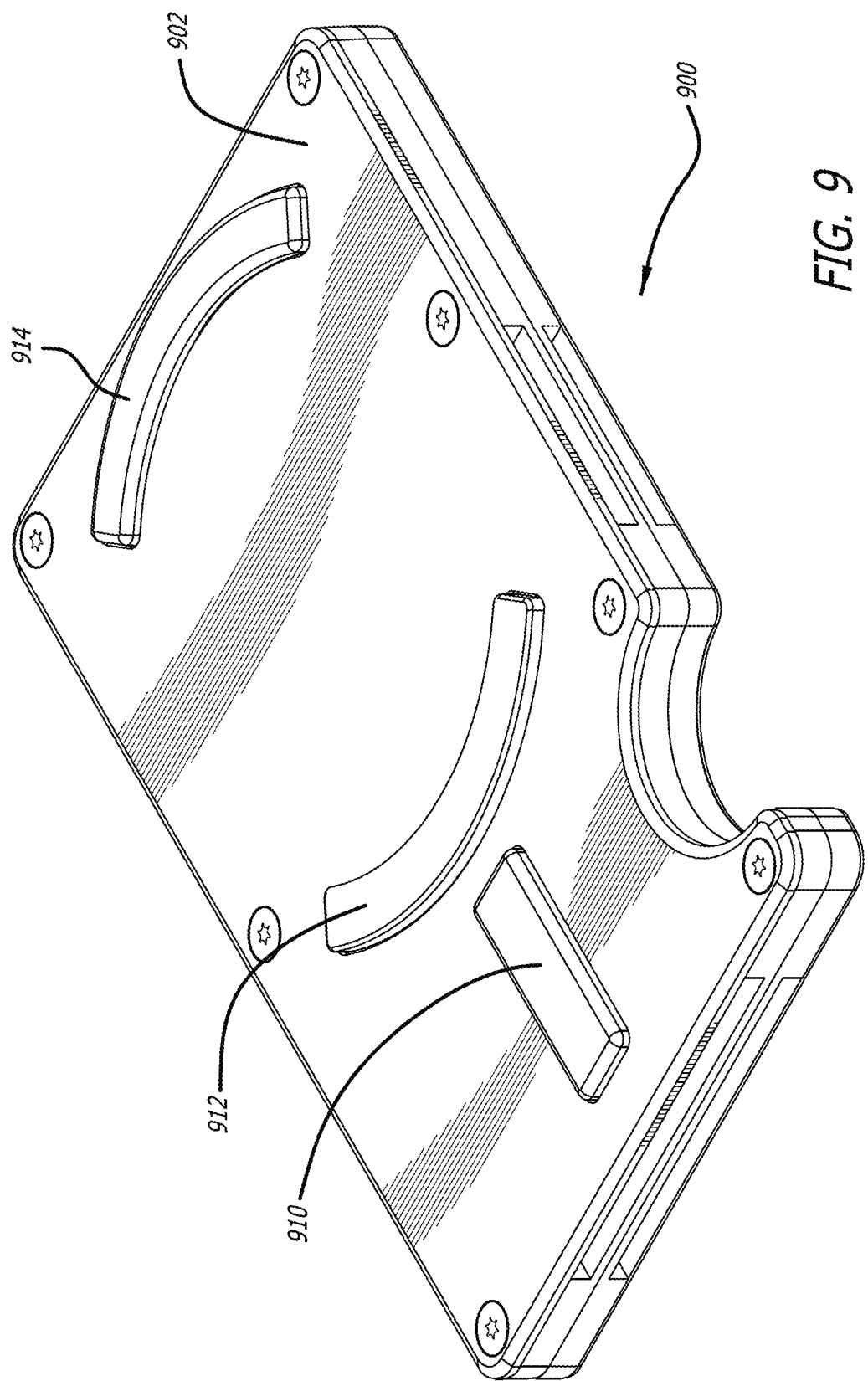
FIG. 9 illustrates an embodiment of a wallet with a plurality of magnets configured to mate with or mount to the plate illustrated in FIG. 8.

FIG. 9 illustrates an embodiment of a wallet accessory with corresponding metallic areas (e.g., magnets) that protrude from an outer surface and engage with areas 812 of the plate 810 from FIG. 8. In particular, in the embodiment illustrated in FIG. 9, a wallet 900 includes a plate 902 with protruding areas 910, 912, and 914 that extend from the surface of the plate 902 and that engage with areas 812 of FIG. 8. The protruding areas 910, 912, and 914 are fully or partially comprised of magnets having the characteristics described herein, and are sufficiently strong to hold the wallet 900 to the corresponding plate (e.g., as shown in FIG. 8) and thus to the electronic device bearing the corresponding plate. In some embodiments, portions of areas 910, 912, and/or 914 may not be magnetized, but rather may be protrusions present for keying purposes only. In some embodiments, additional magnets are positioned in portions of the plate 902 (and correspond with areas of the corresponding plate shown in, for example, FIG. 8) that can mate with those additional magnets. In this way, certain non-protruding areas may be magnet, which has the advantage of position the magnet farther away from the electronic device to which the corresponding plate is mounted. In some embodiments, wherein the wallet 900 has a different size or silhouette, the magnets may be positioned in different places on the plate 902 than those shown in FIG. 9.

Figure 10:
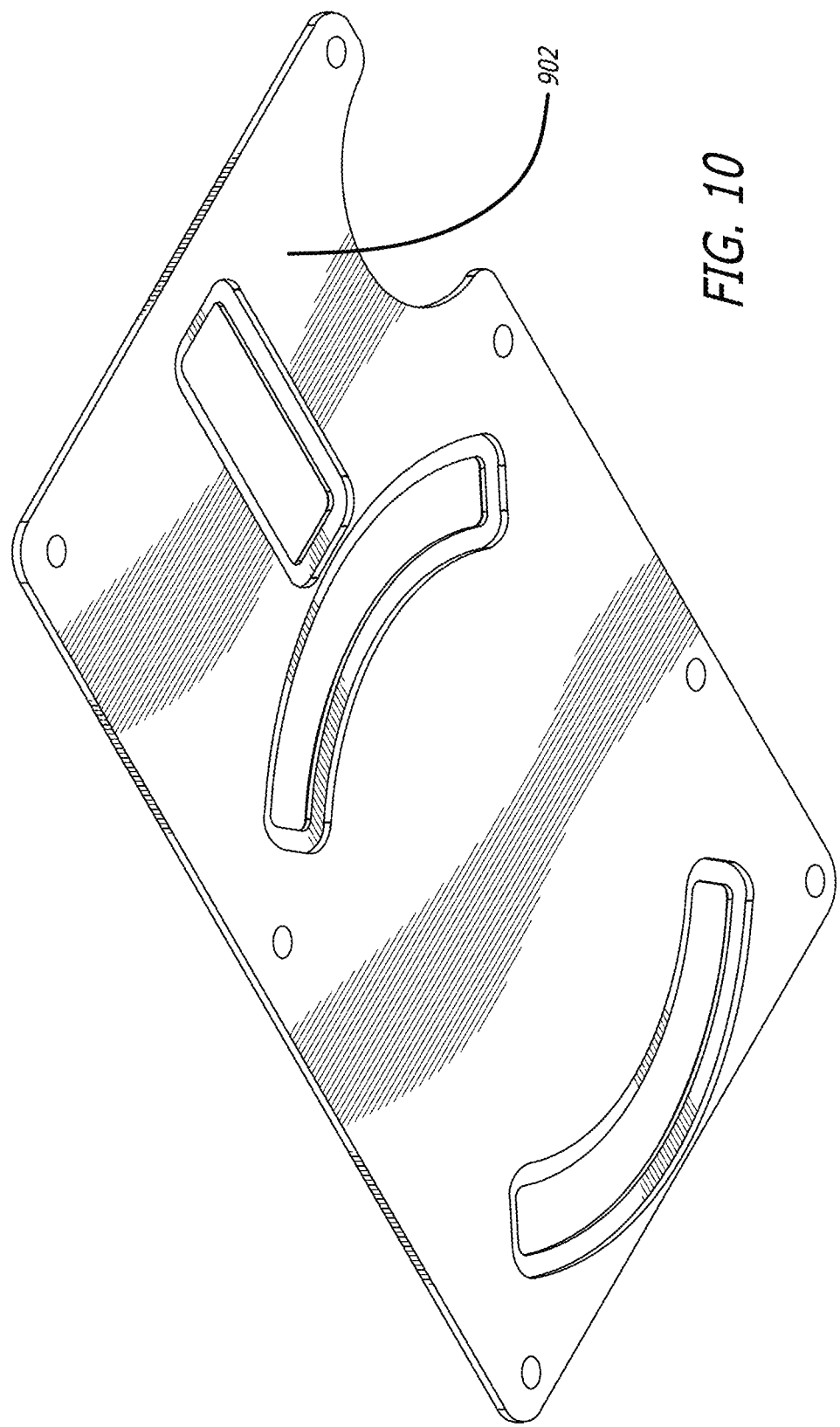
FIG. 10 illustrates the underside of the embodiment of the plate of the wallet illustrated in FIG. 9.

FIG. 10 illustrates an embodiment of a plate of a wallet with a plurality of areas configured to engage with corresponding areas on a mount or plate affixed to an electronic device. In particular, in the embodiment illustrated in FIG. 10, the plate 902 can be seen from the underside, and the areas 910, 912, and 914 (illustrated in FIG. 9) are also visible from the underside of the plate. In some embodiments, the view from the underside of the plate 902 does not reveal the areas 910, 912, and 914; that is, in some embodiments, the plate 902 is solid on the underside and thus the areas are not visible.

Figure 11:
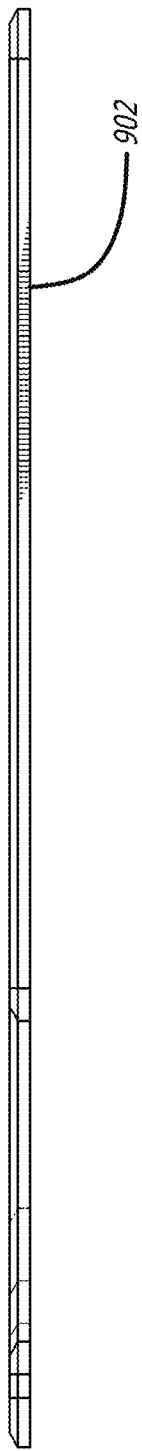
FIGS. 11 and 12 illustrate side views of the embodiment of the plate of the wallet illustrated in FIG. 9.
Figure 12:
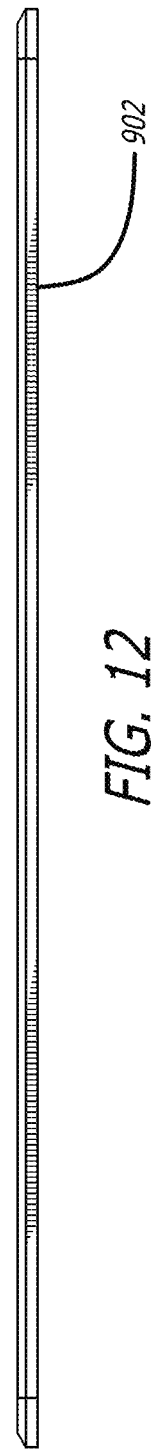

FIGS. 11 and 12 illustrate side views of the embodiment of the plate of the wallet illustrated in FIG. 9. In particular, the embodiment shown in FIGS. 11 and 12 illustrate the plate 902 as illustrated in FIG. 9 when viewed from the long side of the illustrated plate of FIG. 9.

Figure 13:
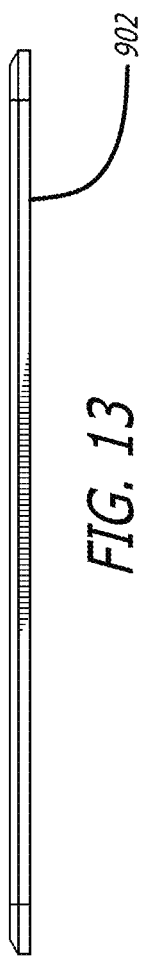
FIGS. 13 and 14 illustrate end views of the embodiment of the plate of the wallet illustrated in FIG. 9.
Figure 14:

FIGS. 13 and 14 illustrate end views of the embodiment of the plate of the wallet illustrated in FIG. 9. In particular, the embodiment shown in FIGS. 13 and 14 illustrate the plate 902 as illustrated in FIG. 9 when viewed from the short side of the illustrated plate of FIG. 9.

Figure 15:
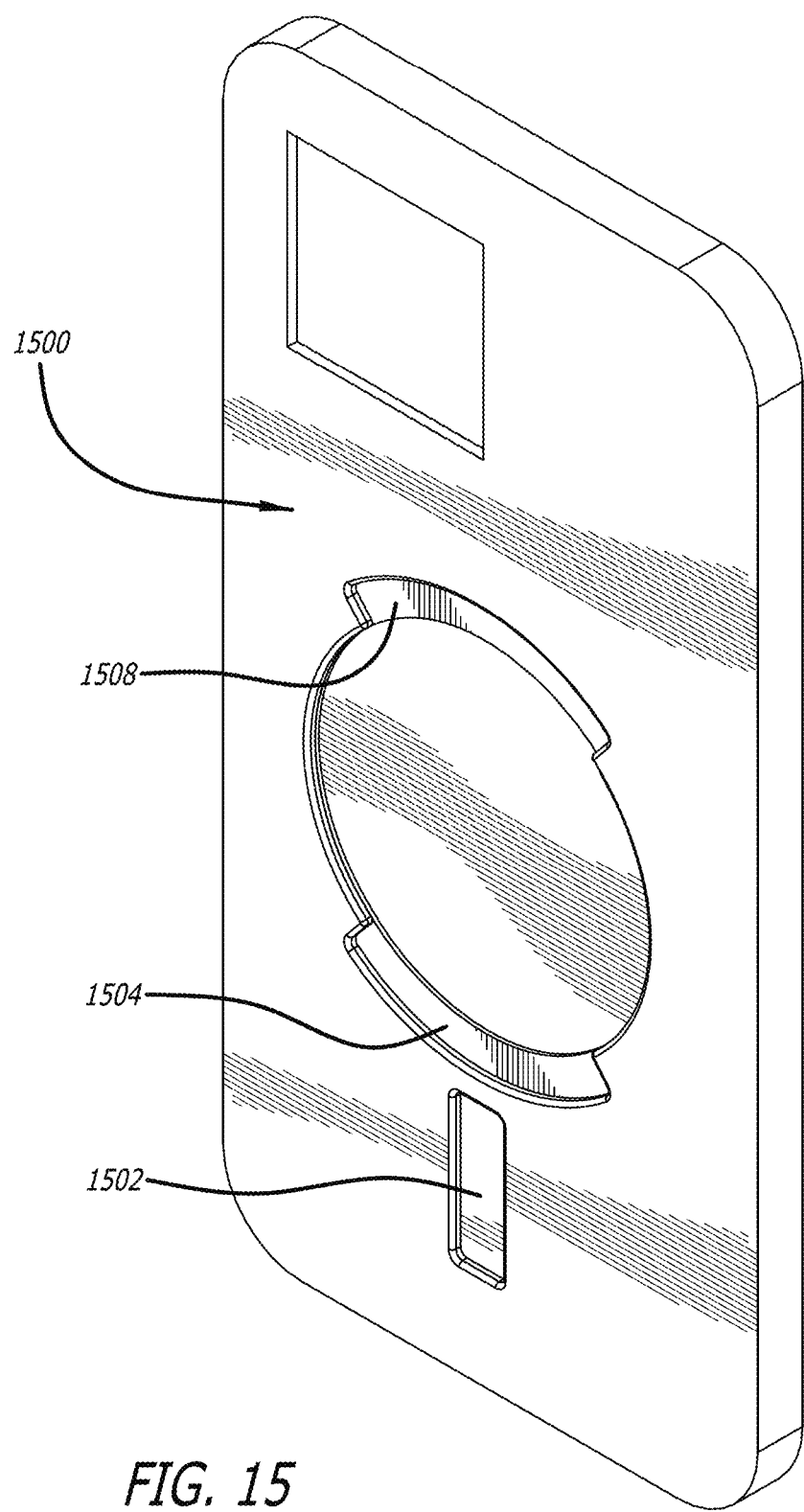
FIG. 15 illustrates an embodiment of a plate configured to engage with a correspondingly shaped accessory (e.g., a wallet) that is integrated into or forms a surface of an electronic device, such as a mobile device or a cellular telephone.

FIG. 15 illustrates an embodiment of a plate configured to engage with a correspondingly shaped accessory (e.g., a wallet) that is integrated into or forms a surface of an electronic device, such as a mobile device or cellular telephone. In particular, in FIG. 15, a plate 1500 is illustrated that includes areas 1502, 1504, and 1508*a* configured to mate with, for example, the plate in FIG. 9 described above. In the illustrated embodiment, the plate 1500 has the same footprint as the overall footprint (or silhouette) of the electronic device. That is, in the illustrated embodiment, the plate 1500 is integrated into (or is affixed to) the electronic device and it is not apparent that a separate plate 1500 is provided. In some embodiments, a manufacturer of the electronic device provides the device in the first instance with the plate 1500 included, meaning that a user need not affix an additional plate to an electronic device, but may still enjoy the benefits of the inventions described herein.

Note that any given embodiment may contain all, none, or any combination of the above aspect ratios, and contain aspect ratios that are not listed herein.

Certain terms are used throughout the description and the claims to refer to particular features or components. As one skilled in the art will appreciate, different persons may refer to the same feature or component by different names. This document does not intend to distinguish between components or features that differ in name but not function.

As used herein, "about," "approximately" and "substantially" are understood to refer to numbers in a range of the referenced number, for example the range of −10% to +10% of the referenced number, preferably −6% to +6% of the referenced number, more preferably −1% to +1% of the referenced number, most preferably −0.1% to +0.1% of the referenced number.

Furthermore, all numerical ranges herein should be understood to include all integers, whole numbers, or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.6 to 9.9, and so forth.

As used in the present disclosure, a phrase referring to "at least one of" a list of items refers to any set of those items, including sets with a single member, and every potential combination thereof. For example, when referencing "at least one of A, B, or C" or "at least one of A, B, and C", the phrase is intended to cover the sets of: A, B, C, A-B, B-C, and A-B-C, where the sets may include one or multiple instances of a given member (e.g., A-A, A-A-A, A-A-B, A A-B-B-C-C-C, etc.) and any ordering thereof. For avoidance of doubt, the phrase "at least one of A, B, and C" shall not be interpreted to mean "at least one of A, at least one of B, and at least one of C".

As used in the present disclosure, the term "determining" encompasses a variety of actions that may include calculating, computing, processing, deriving, investigating, looking up (e.g., via a table, database, or other data structure), ascertaining, receiving (e.g., receiving information), accessing (e.g., accessing data in a memory), retrieving, resolving, selecting, choosing, establishing, and the like.

Without further elaboration, it is believed that one skilled in the art can use the preceding description to use the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

Within the claims, reference to an element in the singular is not intended to mean "one and only one" unless specifically stated as such, but rather as "one or more" or "at least one". Unless specifically stated otherwise, the term "some" refers to one or more. No claim element is to be construed under the provision of 36 U.S.C. § 112(f) unless the element is expressly recited using the phrase "means for" or "step for". All structural and functional equivalents to the elements of the various embodiments described in the present disclosure that are known or come later to be known to those of ordinary skill in the relevant art are expressly incorporated herein by reference and are intended to be encompassed by the claims. Moreover, nothing disclosed in the present disclosure is intended to be dedicated to the public regardless of whether such disclosure is explicitly recited in the claims The invention is claimed as follows:

1. A device, comprising:
   a first magnet, a second magnet, and a third magnet;
   a plate defining:
      a first indentation in which the first magnet is disposed;
      a second indentation in which the second magnet is disposed;
      a third indentation in which the third magnet is disposed;
      a contact surface; and
      a target area;
   wherein the first indentation, the second indentation, and the third indentation are located on the plate relative to a target area of the plate such that a net magnetic field generated by the first magnet, second magnet, and third magnet has a field strength that is below a predefined threshold within the target area; and
   wherein at least one of the first magnet, the second magnet, and the third magnet has a thickness larger than a depth of a corresponding at least one of the first indentation, the second indentation, and the third indentation, such that the at least one of the first magnet, the second magnet, and the third magnet extends beyond an outer surface of the plate.

2. The device of claim 1, wherein the plate is constructed of a non-ferromagnetic material including one or more of aluminum, carbon fiber, plastic, wood, glass, and bamboo.

3. The device of claim 1, wherein magnetic axes of the first magnet and the third magnet are oriented to have a first polarity directed orthogonally outward from the first indentation and the third indentation, respectively, and a magnetic axis of the second magnet is oriented to have a second polarity directed orthogonally outward from the second indentation.

4. The device of claim 1, wherein magnetic axes of the first magnet, the second magnet, and the third magnet are oriented to have a first polarity directed orthogonally outward from the first indentation, the second indentation, and the third indentation, respectively.

5. The device of claim 1, wherein the first magnet, the second magnet, and the third magnet are disposed in the first indentation, the second indentation, and the third indentation, respectively, such that the first magnet, the second magnet, and the third magnet do not extend past a plane into which the first indentation, the second indentation, and the third indentation are defined into the plate.

6. The device of claim 1 wherein an apparent field strength ratio measured at a binding location for the first magnet and at the target area is above a predefined ratio.

7. The device of claim 1, wherein at least one each of the first magnet, the second magnet, and the third magnet has a thickness larger than a depth of a corresponding at least one of the first indentation, the second indentation, and the third indentation, such that the at least one each of the first magnet, the second magnet, and the third magnet extends beyond an outer surface of the plate.

8. The device of claim 1, wherein at least one of the first magnet, the second magnet, and the third magnet has a thickness smaller than a depth of a corresponding at least one of the first indentation, the second indentation, and the third indentation, such that he at least one of the first magnet, the second magnet, and the third magnet does not extend to an outer surface of the plate.

9. A device, comprising:
a first magnet, a second magnet, and a third magnet;
a plate defining:
    a first indentation, in which the first magnet is disposed;
    a second indentation, in which the second magnet is disposed;
    a third indentation, in which the third magnet is disposed;
    a target area; and
    a contact surface;
    wherein the first indentation, the second indentation, and the third indentation are located on the plate such that magnetic fields generated by the first magnet, the second magnet, and the third magnet, at a binding location along a magnetic axis of each magnet, each have a field strength that is above a predefined threshold; and
    wherein at least one of the first magnet, the second magnet, and the third magnet has a thickness larger than a depth of a corresponding at least one of the first indentation, the second indentation, and the third indentation, such that the at least one of the first magnet, the second magnet, and the third magnet extends beyond an outer surface of the plate.

10. The device of claim 9, wherein the plate is constructed of a non-ferromagnetic material including one or more of aluminum, carbon fiber, plastic, wood, glass, and bamboo.

11. The device of claim 9, wherein magnetic axes of the first magnet and the third magnet are oriented to have a first polarity directed orthogonally outward from the first indentation and the third indentation, respectively, and a magnetic axis of the second magnet is oriented to have a second polarity directed orthogonally outward from the second indentation.

12. The device of claim 9, wherein magnetic axes of the first magnet, the second magnet, and the third magnet are oriented to have a first polarity directed orthogonally outward from the first indentation, the second indentation, and the third indentation, respectively.

13. The device of claim 9 wherein the first magnet, the second magnet, and the third magnet are disposed in the first indentation, the second indentation, and the third indentation, respectively, such that the first magnet, the second magnet, and the third magnet do not extend past a plane into which the first indentation, the second indentation and the third indentation are defined into the plate.

14. The device of claim 9 wherein an apparent field strength ratio measured at the binding location for the first magnet and at the target area is above a predefined ratio.

15. A system comprising:
a first device, comprising:
    a first magnet, a second magnet, and a third magnet;
    a plate, defining
        a first indentation in which the first magnet is disposed;
        a second indentation in which the second magnet is disposed;
        a third indentation in which the third magnet is disposed; and
        a plate contact surface; and
a second device, comprising:
    components having a magnetic sensitivity threshold in a target area on a housing contact surface of the second device;
wherein:
the first device and the second device are configured to be magnetically coupled via the plate contact surface and the housing contact surface;
the first indentation, the second indentation, and the third indentation are located on the plate such that a net magnetic field generated by the first magnet, the second magnet, and the third magnet has sufficient strength to magnetically couple the first device to the second device; and
in the target area, the net magnetic field is below the magnetic sensitivity threshold;
wherein at least one component of the second device is indented from an outer surface of the second device, and wherein a corresponding magnet of the first device extends above an outer surface of the first device such that when connected, the first device and the second device are mechanically prevented from misalignment.

16. The system of claim 15, wherein magnetic axes of the first magnet and the third magnet are oriented to have a first polarity directed orthogonally outward from the first indentation and the third indentation, respectively, and a magnetic axis of the second magnet is oriented to have a second polarity directed orthogonally outward from the second indentation.

17. The system of claim 15, wherein magnetic axes of the first magnet, the second magnet, and the third magnet are oriented to have a first polarity directed orthogonally outward from the first indentation, the second indentation, and the third indentation, respectively.

18. The system of claim 15, wherein the first magnet, the second magnet, and the third magnet are disposed in the first indentation, the second indentation, and the third indentation, respectively, such that the first magnet, the second magnet, and the third magnet do not extend past a plane into which the first indentation, the second indentation, and the third indentation are defined into the plate.

19. The system of claim 15, wherein an apparent field strength ratio measured at a binding location for the first magnet between the plate contact surface and the housing contact surface and at the target area between plate contact surface and the housing contact surface is above a predefined ratio.

* * * * *